(12) United States Patent
Ukai et al.

(10) Patent No.: US 10,399,878 B2
(45) Date of Patent: Sep. 3, 2019

(54) WATER TREATMENT SYSTEM AND POWER GENERATION FACILITY

(71) Applicant: MITSUBISHI HEAVY INDUSTRIES, LTD., Tokyo (JP)

(72) Inventors: Nobuyuki Ukai, Tokyo (JP); Susumu Okino, Tokyo (JP); Hideo Suzuki, Tokyo (JP); Hiroshi Nakashoji, Tokyo (JP); Shigeru Yoshioka, Tokyo (JP); Tomomi Komatsu, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 781 days.

(21) Appl. No.: 14/784,053

(22) PCT Filed: Mar. 19, 2015

(86) PCT No.: PCT/JP2015/058375
§ 371 (c)(1),
(2) Date: Oct. 13, 2015

(87) PCT Pub. No.: WO2016/147414
PCT Pub. Date: Sep. 22, 2016

(65) Prior Publication Data
US 2017/0029306 A1    Feb. 2, 2017

(51) Int. Cl.
*B01D 21/01*    (2006.01)
*B01D 61/02*    (2006.01)
(Continued)

(52) U.S. Cl.
CPC ............... *C02F 9/00* (2013.01); *B01D 21/01* (2013.01); *B01D 61/00* (2013.01); *B01D 61/025* (2013.01);
(Continued)

(58) Field of Classification Search
CPC .... B01D 61/00; B01D 61/025; B01D 61/027; B01D 61/04; B01D 61/145; B01D 61/147;
(Continued)

(56) References Cited

U.S. PATENT DOCUMENTS 5,453,206 A    9/1995  Browne
5,904,853 A    5/1999  Allen et al.
(Continued)

FOREIGN PATENT DOCUMENTS

JP    51-90160 A    8/1976
JP    7-39881 A     2/1995
(Continued)

OTHER PUBLICATIONS

Extended (supplementary) European Search Report dated Jun. 1, 2016, issued in counterpart Application No. 15766376.6. (8 pages).
(Continued)

*Primary Examiner* — Robert Clemente
*Assistant Examiner* — Akash K Varma
(74) *Attorney, Agent, or Firm* — Westerman, Hattori, Daniels & Adrian, LLP

(57) ABSTRACT

The water treatment system includes: an aluminate ion addition part for adding an aluminate ion additive to water to be treated containing at least salt content and silica; a first precipitation part provided on the downstream side of the aluminate ion addition part; a first pH adjustment part provided on the downstream side of the first precipitation part; a first solid/liquid separation part for separating the solid content in the water to be treated; a second pH adjustment part for adjusting the pH of the water to be treated from the first solid/liquid separation part to a second pH level; and a first separation membrane (desalination treatment) apparatus provided on the downstream side of the
(Continued)

second pH adjustment part so as to separate the water to be treated into first permeated water and first non-permeated water by removing the salt content in the water to be treated.

14 Claims, 18 Drawing Sheets

(51) Int. Cl.
| | |
|---|---|
| *B01D 61/04* | (2006.01) |
| *B01D 61/16* | (2006.01) |
| *B01D 65/02* | (2006.01) |
| *B01D 61/00* | (2006.01) |
| *B01D 61/14* | (2006.01) |
| *C02F 9/00* | (2006.01) |
| *C02F 1/00* | (2006.01) |
| *C02F 1/44* | (2006.01) |
| *C02F 1/52* | (2006.01) |
| *C02F 1/60* | (2006.01) |
| *C02F 5/00* | (2006.01) |
| *C02F 5/02* | (2006.01) |
| *C02F 5/08* | (2006.01) |
| *C02F 1/66* | (2006.01) |
| *C02F 1/68* | (2006.01) |
| *C02F 1/72* | (2006.01) |
| *C02F 103/02* | (2006.01) |
| *C02F 103/10* | (2006.01) |
| *C02F 103/34* | (2006.01) |
| *C02F 101/10* | (2006.01) |
| *C02F 101/20* | (2006.01) |

(52) U.S. Cl.
CPC ........... *B01D 61/027* (2013.01); *B01D 61/04* (2013.01); *B01D 61/145* (2013.01); *B01D 61/147* (2013.01); *B01D 61/16* (2013.01); *B01D 65/02* (2013.01); *C02F 1/008* (2013.01); *C02F 1/44* (2013.01); *C02F 1/52* (2013.01); *C02F 1/60* (2013.01); *C02F 5/00* (2013.01); *C02F 5/02* (2013.01); *C02F 5/08* (2013.01); *B01D 2321/40* (2013.01); *C02F 1/004* (2013.01); *C02F 1/441* (2013.01); *C02F 1/442* (2013.01); *C02F 1/444* (2013.01); *C02F 1/5245* (2013.01); *C02F 1/5254* (2013.01); *C02F 1/66* (2013.01); *C02F 1/68* (2013.01); *C02F 1/72* (2013.01); *C02F 5/083* (2013.01); *C02F 2001/5218* (2013.01); *C02F 2101/10* (2013.01); *C02F 2101/20* (2013.01); *C02F 2103/023* (2013.01); *C02F 2103/10* (2013.01); *C02F 2103/346* (2013.01); *C02F 2209/06* (2013.01); *C02F 2303/16* (2013.01)

(58) Field of Classification Search
CPC . B01D 61/16; C02F 1/008; C02F 1/44; C02F 1/52; C02F 1/60; C02F 1/004; C02F 1/441; C02F 1/442; C02F 1/444; C02F 1/5245; C02F 1/66; C02F 1/68; C02F 1/72; C02F 9/00
USPC .......................................................... 210/96
See application file for complete search history.

(56) References Cited

U.S. PATENT DOCUMENTS

| | | | |
|---|---|---|---|
| 6,582,605 B2* | 6/2003 | Krulik | C02F 1/5236 |
| | | | 210/638 |
| 7,815,804 B2 | 10/2010 | Nagghappan | |
| 8,388,917 B2* | 3/2013 | Ukai | B01D 53/75 |
| | | | 423/210 |
| 2008/0135478 A1 | 6/2008 | Zuback et al. | |
| 2009/0269262 A1* | 10/2009 | Murakami | B01D 53/501 |
| | | | 423/210 |
| 2011/0052470 A1* | 3/2011 | Ukai | B01D 53/64 |
| | | | 423/243.08 |
| 2011/0262331 A1* | 10/2011 | Ukai | B01D 53/75 |
| | | | 423/235 |
| 2011/0268637 A1* | 11/2011 | Ukai | B01D 53/75 |
| | | | 423/235 |
| 2012/0285893 A1* | 11/2012 | Moore | C02F 1/52 |
| | | | 210/723 |
| 2014/0251914 A1* | 9/2014 | Ball | C02F 9/00 |
| | | | 210/667 |
| 2015/0053596 A1 | 2/2015 | Kageyama et al. | |
| 2015/0068982 A1 | 3/2015 | Yoshiyama et al. | |

FOREIGN PATENT DOCUMENTS

| | | |
|---|---|---|
| JP | 10-137759 A | 5/1998 |
| JP | 2004-141799 A | 5/2004 |
| JP | 2015-42385 A | 3/2015 |
| WO | 2011/143775 A1 | 11/2011 |
| WO | 2015/002309 A1 | 1/2015 |

OTHER PUBLICATIONS

International Search Report dated Apr. 21, 2015, issued in counterpart application No. PCT/JP2015/058375 (4 pages).
Written Opinion dated Apr. 21, 2015, issued in counterpart application No. PCT/JP2015/058375, w/English translation (17 pages).

* cited by examiner

WATER TREATMENT SYSTEM AND POWER GENERATION FACILITY

TECHNICAL FIELD

The present invention relates to a water treatment system for cooling tower blowdown water or the like and a power generation facility.

BACKGROUND ART

In a cooling tower used at a plant facility or the like, heat exchange is performed between cooling water and high-temperature exhaust gas discharged from a boiler or the like. A portion of the cooling water becomes steam due to this heat exchange, so the ions or silica ($SiO_2$) in the cooling water are concentrated. Accordingly, the cooling water discharged from the cooling tower (blowdown water) reaches a state with a high ion concentration or silica concentration.

Water containing large quantities of ions is released into the environment after being desalinated. Known examples of apparatuses for performing desalination treatment include a reverse osmosis membrane apparatus, a nanofiltration membrane apparatus, and an ion exchange membrane apparatus.

Of the ions contained in the water described above, monovalent positive ions such as $Na^+$, $K^+$, and $NH4^+$ or negative ions such as $Cl^-$ and $NO_3^-$ are ions with high solubility in water. On the other hand, divalent metal ions such as $Ca^{2+}$, negative ions such as $SO_4^{2-}$ and $CO_3^{2-}$, or silica are components constituting scale. Since salts or silica serving as components constituting scale have low solubility with respect to water, they are easily deposited as scale. In particular, $Ca^{2+}$, $SO_4^{2-}$, and carbonic acid ions ($CO_3^{2-}$ and $HCO_3^-$), and silica are contained in abundance in brine, industrial waste water, and blowdown water of cooling towers. When scale is generated inside the apparatus for performing the desalination treatment described above, the treatment capacity is diminished. Therefore, there is a demand to perform desalination treatment without generating scale.

The lime-soda method is known as a method for removing $Ca^{2+}$. In the lime-soda method, sodium carbonate is added to water to be treated, and the $Ca^{2+}$ in the water to be treated is deposited/precipitated as calcium carbonate and thereby removed from the water.

Patent Document 1 discloses a waste water treatment system using the lime-soda method in which a chemical softening apparatus, an ion exchange apparatus, a reverse osmosis membrane apparatus, and the like are combined.

In addition, a method for removing silica from large quantities of waste water is disclosed in Patent Document 2, and it is proposed to add a sodium aluminate solution to waste water so as to substantially reduce the silica concentration in the waste water.

CITATION LIST

Patent Literature

Patent Document 1: U.S. Pat. No. 7,815,804
Patent Document 2: U.S. Pat. No. 5,904,853

SUMMARY OF INVENTION

Technical Problem

Meanwhile, the lime-soda method involves a high treatment cost since it is necessary to add sodium carbonate for the purpose of treatment. With the lime-soda method, when 1 mol of $Ca^{2+}$ is precipitated as calcium carbonate, 2 mol of $Na^+$ is generated. On the other hand, when $SO_4^{2-}$ is contained in water to be treated, it is not removed by the lime-soda method. That is, the lime-soda method results in an increase in the number of moles of ions contained in the water after treatment.

Even when $Ca^{2+}$ is removed using an ion exchange membrane apparatus, 2 mol of $Na^+$ is generated in order to treat 1 mol of $Ca^{2+}$, and the number of moles of ions contained in the water after treatment increases.

In the proposal of Patent Document 1, water that has been treated by the lime-soda method and an ion exchange membrane apparatus is further treated to remove the ion content with a reverse osmosis membrane apparatus. Therefore, in the system of Patent Document 1, the molar concentration of ions increases, so the osmotic pressure in the reverse osmosis membrane apparatus becomes high, which leads to the problem that the treatment load becomes large.

In addition, with the apparatus of Patent Document 1, $SO_4^{2-}$ is not removed, and $SO_4^{2-}$ remains in the treatment water, which makes it difficult to achieve a high water recovery ratio. Further, with the waste water treatment system of Patent Document 1, large quantities of chemicals are necessary when reusing the ion exchange apparatus, and the high treatment cost is also problematic.

In addition, in the proposal of Patent Document 2, when an attempt is made to reuse treatment water to which sodium aluminate has been added with a reverse osmosis membrane apparatus having a reverse osmosis membrane (RO), deposits are generated by the concentration of unreacted residual aluminum ions on the reverse osmosis membrane surface, which leads to the problem that the reverse osmosis membrane surface is blocked. As a result, there is the problem that treatment water cannot be recycled with the reverse osmosis membrane apparatus.

In light of the problems described above, an object of present invention is to provide a water treatment system for water to be treated containing at least salt content and silica such as cooling tower blowdown water from a cooling tower, for example, used in a plant facility or the like, for example, and a power generation facility.

Solution To Problem

The first invention of the present invention for solving the problem described above is a water treatment system equipped with: an aluminate ion addition part for adding an aluminate ion additive to water to be treated containing at least salt content and silica; a first precipitation part provided on a downstream side of the aluminate ion addition part so as to precipitate and separate solid content in the water to be treated; a first pH adjustment part provided on a downstream side of the first precipitation part so as to adjust residual aluminum in the water to be treated to a precipitated first pH level by supplying a first pH adjusting agent to the water to be treated from the first precipitation part; a first solid/liquid separation part provided on a downstream side of the first pH adjustment part so as to separate solid content in the water to be treated that has been adjusted to the first pH level; a second pH adjustment part provided on a downstream side of the first solid/liquid separation part so as to adjust a pH in the water to be treated to a second pH level of at most pH 5 by supplying a second pH adjusting agent to the water to be treated from the first solid/liquid separation part; and a first separation membrane apparatus provided on a downstream side of the second pH adjustment part so as to separate the water to be treated into first permeated water and first non-permeated water by removing salt content in the water to be treated.

The second invention is the water treatment system according to the first invention equipped with a heavy metal removal part provided on an upstream side of the aluminate ion addition part so as to remove heavy metals from the water to be treated.

The third invention is the water treatment system according to the second invention equipped with: a first gypsum crystallization tank provided on a downstream side of the heavy metal removal part so as to crystallize gypsum from the water to be treated; and a first gypsum precipitation tank for precipitating and separating the crystallized gypsum.

The fourth invention is the water treatment system according to the first invention equipped with: a separation membrane apparatus for pretreatment provided on an upstream side of the aluminate ion addition part so as to separate the water to be treated into pretreated permeated water and pretreated non-permeated water by removing salt content in the water to be treated; a third pH adjustment part provided on a downstream side of the separation membrane apparatus for pretreatment so as to adjust a pH of the pretreated non-permeated water to an acidic side of a third pH level by supplying a third pH adjusting agent to the pretreated non-permeated water; a first gypsum crystallization tank provided on a downstream side of the third pH adjustment part so as to crystallize gypsum from the pretreated non-permeated water; and a first gypsum precipitation tank for precipitating and separating the crystallized gypsum.

The fifth invention is the water treatment system according to one of the first through fourth inventions equipped with an inlet side pH adjustment part so as to adjust the water to be treated to an alkaline side by supplying an inlet side pH adjusting agent to the water to be treated that is introduced from an inlet side of the water treatment system.

The sixth invention is the water treatment system according to one of the first through fifth inventions equipped with a Mg agent addition part provided on an upstream side of the aluminate ion addition part so as to add a Mg agent to the water to be treated.

The seventh invention is the water treatment system according to one of the first through sixth inventions equipped with a flocculant mixing part provided on a downstream side of the aluminate ion addition part so as to add and mix a flocculant into the water to be treated to which the aluminate ion additive has been added.

The eighth invention is the water treatment system according to the seventh invention, wherein the flocculant mixing part comprises a polymer flocculant mixing part and an iron-based flocculant mixing part.

The ninth invention is the water treatment system according to one of the first through eighth inventions equipped with a concentrator for concentrating first concentrated water from the first separation membrane apparatus.

The tenth invention is the water treatment system according to one of the first through ninth inventions equipped with: a silica concentration meter for measuring a concentration of silica in the water to be treated and an aluminum concentration meter for measuring a concentration of aluminum in the water to be treated between the first solid/liquid separation part and the first separation membrane apparatus; and a control device which, as a result of the monitoring of the silica concentration meter or the aluminum concentration meter, changes to operating conditions in which the silica concentration and/or the aluminum concentration are set to at most a prescribed threshold.

The eleventh invention is the water treatment system according to one of the first through tenth inventions equipped with: a membrane separation state monitoring part for monitoring a desalination state of the first separation membrane apparatus; and a control device which, as a result of the monitoring of the membrane separation state monitoring part, executes washing treatment on the first separation membrane apparatus and/or changes to operating conditions in which adhered matter of the first separation membrane apparatus does not adhere to the membrane.

The twelfth invention is the water treatment system according to one of the first through eleventh inventions equipped with: a third pH adjustment part provided on a downstream side of the first separation membrane apparatus so as to adjust a pH of the first non-permeated water to an acidic side of a third pH level by supplying a third pH adjusting agent to the first non-permeated water; a second gypsum crystallization tank provided on a downstream side of the third pH adjustment part so as to crystallize gypsum from the first concentrated water; a second gypsum precipitation tank for precipitating and separating the crystallized gypsum; a flocculant mixing part provided on a downstream side of the second gypsum precipitation tank so as to add a flocculant to supernatant water from the second gypsum precipitation tank; a second precipitation part for precipitating and separating a precipitate produced by the flocculant; a second solid/liquid separation part for performing solid/liquid separation on residual aggregates in the supernatant water from the second precipitation part; a fourth pH adjustment part provided on a downstream side of the second solid/liquid separation part so as to adjust a pH of the separated and concentrated water to an acidic side of a fifth pH level by supplying a fourth pH adjusting agent to supernatant water from the second solid/liquid separation part; and a second separation membrane apparatus provided on a downstream side of the fourth pH adjustment part so as to separate the water to be treated into second permeated water and second non-permeated water by removing salt content in the water to be treated.

The thirteenth invention is the water treatment system according to one of the first through twelfth inventions, wherein the permeated water is makeup water for a plant facility or water for miscellaneous use.

The fourteenth invention is a power generation facility equipped with the water treatment system of one of the first through thirteenth inventions.

Advantageous Effects of Invention

According to the present invention, when reusing water to be treated containing at least salt content and silica such as cooling tower blowdown water from a cooling tower, for example, used at a plant facility or the like, it becomes possible to stably recycle water by efficiently removing soluble silica from the water to be treated.

DESCRIPTION OF EMBODIMENTS

The following is a detailed description of a preferred embodiment of the present invention with reference to the attached drawings. Note that the present invention is not limited by the embodiment, and when a plurality of embodiments are present, the invention is intended to include a configuration combining these embodiments.

Embodiment 1

Figure 1:
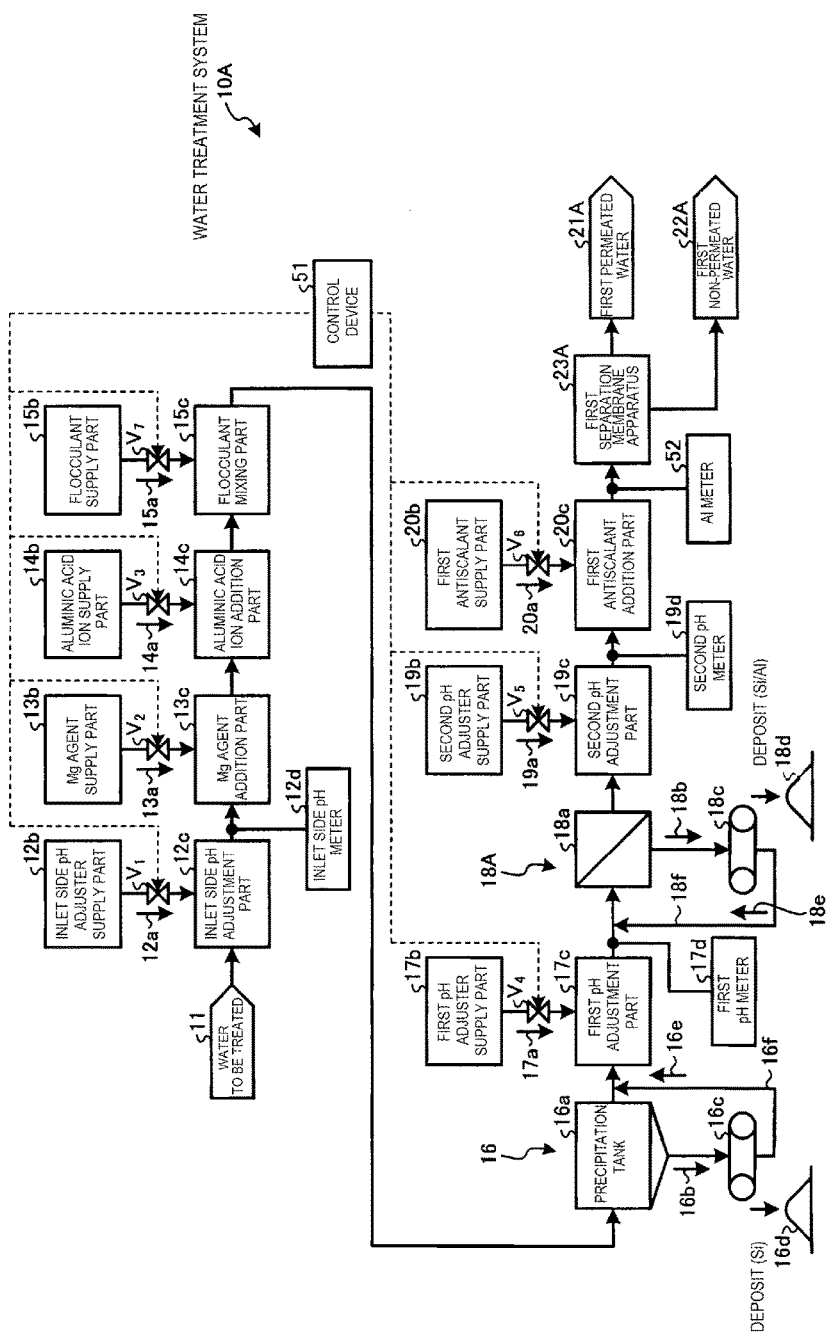
FIG. 1 is a schematic view of a water treatment system of Working Example 1.

FIG. 1 is a schematic view of a water treatment system of Working Example 1. As illustrated in FIG. 1, a water treatment system 10A of this working example is equipped with: an aluminate ion addition part 14c for supplying and adding an aluminate ion additive 14a from an aluminate ion supply part 14b to water to be treated 11 containing at least salt content and silica; a first precipitation part 16 provided on the downstream side of the aluminate ion addition part 14c so as to precipitate and separate solid content in the water to be treated 11; a first pH adjustment part 17c provided on the downstream side of the first precipitation part 16 so as to adjust the pH to a first pH level (from pH to 7) which precipitates the residual aluminum in the water to be treated 11 by supplying a first pH adjusting agent 17a from a first pH adjusting agent supply part 17b to the water to be treated (supernatant water) 11 from the first precipitation part 16; a first solid/liquid separation part (for example, a UF membrane, an NF membrane, an MF membrane, or the like) 18A provided on the downstream side of the first pH adjustment part 17c so as to separate the solid content in the water to be treated 11 adjusted to the first pH level; a second pH adjustment part 19c provided on the downstream side of the first solid/liquid separation part 18A so as to adjust the pH in the water to be treated 11 to a second pH level of at most pH 5 by supplying a second pH adjusting agent 19a from a second pH adjusting agent supply part 19b to the water to be treated (permeated water) 11 from the first solid/liquid separation part 18A; a first antiscalant addition part 20c provided on the downstream side of the second pH adjustment part 19c so as to supply and add a antiscalant 20a to the water to be treated 11 from a first antiscalant supply part 20b; and a first separation membrane (desalination treatment) apparatus 23A provided on the downstream side of the first antiscalant addition part 20c so as to separate the water to be treated into first permeated water (recycled water) 21A and first non-permeated water (concentrated water) 22A by removing the salt content in the water to be treated 11. In FIG. 1, symbol 51 is a control device, and $V_1$ to $V_7$ illustrate opening/closing valves which are opened and closed by the control device 51.

Here, cooling tower blowdown water (called "blowdown water" hereafter) generated by a cooling tower (not illustrated) can be used as an example in this working example as the water to be treated 11 containing at least salt content and silica. This cooling tower blowdown water contains an abundance of $Ca^{2+}$, $SO_4^{2-}$, carbonic acid ions ($CO_3^{2-}$ and $HCO_3^-$), and silica, for example. As an example of the characteristics of the blowdown water, the water has a pH of 8, 20 mg/L of Na ions, 5 mg/L of K ions, 50 mg/L of Ca ions, 15 mg/L of Mg ions, 200 mg/L of $HCO_3$ ions, 200 mg/L of Cl ions, 120 mg/L of $SO_4$ ions, 5 mg/L of $PO_4$ ions, and 35 mg/L of $SiO_2$ ions. Of these, the concentrations of Ca ions, Mg ions, $SO_4$ ions, and $HCO_3$ ions are high, and scale ($CaSO_4$, $CaCO_3$, or the like) is produced by a reaction in the presence of these ions. In addition, silica components present in the blowdown water also become adhered components of membrane adhesion due to the concentration rate in the first separation membrane apparatus 23A.

Here, examples of plants using a water cooling-type cooling tower includes plants having a power generation facility (such as an industrial power generation facility for power selling business or in-plant power use; power generation including thermal power generation, geothermal power generation, or the like) and a cooling facility. In addition, examples of plants include general chemical plants, steel making plants, petroleum refining plants, plants for producing machinery, paper, cement, food items, and drugs, plants for mining minerals, oil, and gas, water treatment plants, incineration plants, and regional air conditioning facilities.

Further, in addition to cooling tower blowdown water, examples of the water to be treated 11 containing at least salt content and silica include acid mine drainage (AMD), water accompanying petroleum gas (PW), flue gas desulfurization (FGD) waste water, for example, boiler supply treatment water for plants using ground water, river water, or lake water, for example, as a water source, plant waste water recovery water of semiconductor or automobile factories, for example, and industrial park waste water.

This acid mine drainage (AMD) has at most approximately 15 mg/L of $SiO_2$ ions. Water accompanying petroleum gas (PW) has from 1 to at most approximately 200 mg/L of $SiO_2$ ions. Flue gas desulfurization (FGD) waste water has from 50 to at most 100 mg/L of $SiO_2$ ions. Boiler supply treatment water for plants using ground water, river water, or lake water, for example, as a water source, has at most 40 mg/L of $SiO_2$ ions, and at most approximately 100 mg/L of the total dissolved solid (TDS). Plant waste water recovery water of semiconductor or automobile factories, for example, or industrial park waste water has at most approximately 25 mg/L of $SiO_2$ ions and from 100 to at most approximately 300 mg/L of the total dissolved solid (TDS).

In the working example illustrated in FIG. 1, the first separation membrane apparatus 23A uses a reverse osmosis membrane apparatus (RO) equipped with a reverse osmosis membrane. A nanofiltration membrane (NF), an electrodialysis (ED) equipment, an electrodialysis reversal (EDR) equipment, an electrodeionization apparatus (EDI), an electrostatic desalination apparatus (CD1), an evaporator, or the like can also be applied appropriately instead of this reverse osmosis membrane apparatus.

Here, in a nanofiltration membrane (NF), an electrodialysis (ED) equipment, an electrodialysis reversal (EDR) equipment, an electrodeionization apparatus (EDI), an ion exchanged resin apparatus (IEx), or an electrostatic desalination apparatus (CD1), scale components (divalent ions, $Ca^{2+}$, $Mg^{2+}$, or the like), are selectively removed, and monovalent ions such as NaCl are transmitted. By suppressing the concentration of the ion concentration of concentrated water, it is possible to improve the water recovery rate and conserve energy (for example, a reduction in pump power).

In addition, when treatment water is used as makeup water for cooling tower cooling water, for example, it is not necessarily purified water as long as the scale components (divalent ions, $Ca^{2+}$ and $Mg^{2+}$) are removed, which yields the advantage that a nanofiltration membrane (NF) or the like can be used.

In this working example, an inlet side pH adjustment part 12c is provided on the upstream side of the aluminate ion addition part 14c. This inlet side pH adjustment part 12c adjusts the pH of the water to be treated 11 to the alkaline side by adding a first pH adjusting agent 12a such as various acids and various bases. Examples of pH adjusting agents include various bases such as sodium hydroxide and calcium hydroxide. The pH in the first pH adjustment part 12c is preferably from 7 to 10 and is particularly preferably set to around pH 9, as described below, but the pH is not limited to this range and is not particularly limited as long as it is within a range in which the soluble silica contained in the water to be treated 11 can be easily crystallized. The added amount of the first pH adjusting agent 12a is controlled by the control device 51 via the valve $V_1$. When the pH of the water to be treated 11 is from 8 to 10, it is unnecessary to adjust the inlet side pH.

In this working example, a Mg agent addition part 13c is provided on the downstream side of the inlet side pH adjustment part 12c and on the upstream side of the aluminate ion addition part 14c. This Mg agent addition part 13c adjusts the magnesium ion concentration in the water to be treated 11 to within a prescribed range by adding a magnesium ion additive (also called a "Mg agent" hereafter) to the water to be treated 11. As a result, it is possible to adjust the magnesium ion concentration in the water to be treated 11 to within a moderate range, so at the time of the deposition of soluble silica by the aluminate ion addition part 14c, Mg—Al—Si compounds such as $Mg_5Al[AlSi_3O_{10}(OH_2)]$ $OH)_6$, for example, are formed efficiently, and the concentration of soluble silica in the water to be treated 11 can be reduced even further. In addition, the residual aluminum ion concentration in the water to be treated 11 can also be reduced. The added amount of the Mg agent 13a is controlled by the control device 51 via the valve $V_2$. When the concentration of soluble silica in the water to be treated 11 is low, it is unnecessary to make an adjustment by adding a Mg agent.

Examples of the Mg agent 13a include various magnesium salts such as magnesium oxide, magnesium hydroxide, magnesium alkoxide, magnesium acetate, magnesium carbonate, magnesium chloride, and magnesium sulfate.

Of these, it is preferable to use an aqueous solution of magnesium sulfate from the perspective that soluble silica can be crystallized efficiently.

A soluble silica removing effect can be achieved when the magnesium ion concentration in the water to be treated 11 is 60 mg/L or higher, and it can be seen that the magnesium ion concentration in the water to be treated 11 is preferably at least 90 mg/L and more preferably at least 120 mg/L from the perspective of the soluble silica removal efficiency and the perspective of reducing the used amount of the aluminate ion additive that is added as necessary.

From the perspective of efficiently crystallizing soluble silica, the content of magnesium ions in the water to be treated 11 is preferably such that the concentration of magnesium with respect to soluble silica ($Mg/SiO_2$) is greater than 0, more preferably at least 1.5, and even more preferably at least 3 and preferably at most 10, more preferably at most 7, and even more preferably at most 5.

The aluminate ion addition part 14c adds an aluminate ion additive 14a expressed by the following general formula (1) to the water to be treated 11. By adding this aluminate ion additive 14a in the water to be treated 11, compounds of the aluminate ion additive 14a and the soluble silica contained in the water to be treated 11 (for example, $Mg_5Al[AlSi_3O_{10}(OH)_2](OH)_6$, $NaAlO_2.(SiO_2)_3$, and the like) are deposited, so it becomes possible to efficiently remove the soluble silica contained in the water to be treated 11.

$$[Al(OH)_4]^- \qquad \text{Formula (1)}$$

The aluminate ion additive 14a is not particularly limited as long as it produces aluminate ions in the water to be treated 11, and examples include various aluminate salts such as sodium aluminate (sodium tetrahydroxoaluminate), lithium aluminate, sodium aluminate, potassium aluminate, strontium aluminate, calcium aluminate, and magnesium aluminate and water containing aluminate ions. Of these, sodium aluminate is preferable from the perspective of the removal efficiency of soluble silica in the water to be treated 11. A sodium aluminate aqueous solution (for example, a mixture of $Al_2O_3$ and $Na_2O$) can be used as sodium aluminate.

The configuration of the aluminate ion addition part 14c for depositing soluble silica is not particularly limited as long as soluble silica can be deposited. For example, it may or may not have a mixing tank provided with a prescribed stirring apparatus. When it has a mixing tank, the aluminate ion additive 14a is added as necessary to the water to be treated 11 having a pH that has been adjusted to a prescribed range in the mixing tank, and this is mixed by stirring to deposit soluble silica. As a result, the aluminate ion additive 14a is mixed rapidly and uniformly, and soluble silica is deposited in a reaction time of aluminate ions and silica of approximately a few seconds to approximately a few tens of seconds without coagulation. Stirring may be performed at a low stirring speed or a high stirring speed. By stirring rapidly at a stirring speed of 100 rpm or higher, it is also possible to reduce the volume of the mixing tank. In addition, in an aluminate ion addition part 14c that does not have a mixing tank, the aluminate ion additive 14a is mixed within the piping by line chemical feeding and line mixing as necessary from a branch pipe provided in the piping through which the water to be treated 11 flows. In this case, the stirring efficiency can be improved by providing a member for disrupting the flow such as a static mixer or an elbow in the piping.

In this working example, the deposition of soluble silica means that a compound of soluble silica and aluminate ions (so-called "aluminum silica ($Al$—$SiO_2$) compound") is deposited as a solid from within the liquid. Here, the mode of deposition may be such that a compound of soluble silica and aluminate ions is deposited in an amorphous state or is deposited as a crystal.

Here, the solubility of soluble silica ($SiO_2$) in the water to be treated 11 of the water treatment system 10A of this working example will be described.

Figure 3:
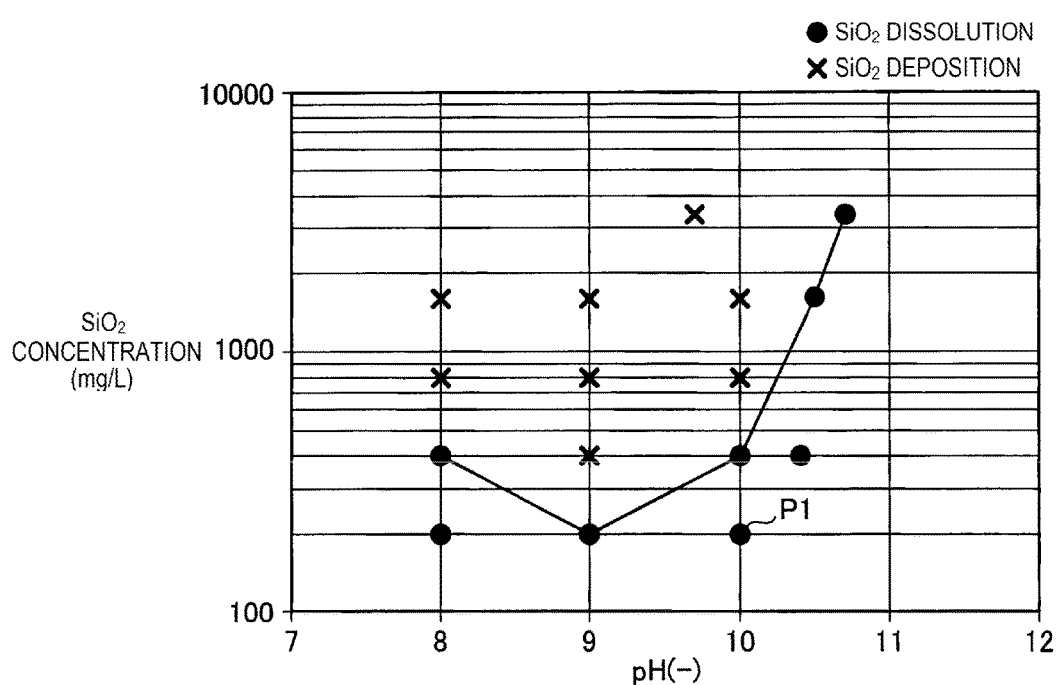
FIG. 3 illustrates the relationship between the pH of the water to be treated and the solubility of soluble silica with respect to the water to be treated.

FIG. 3 illustrates the relationship between the pH of the water to be treated and the solubility of soluble silica with respect to the water to be treated. FIG. 3 illustrates the results of observing the deposition of $SiO_2$ after diluting an aqueous solution in which soluble silica is dissolved under alkaline conditions so as to achieve a prescribed $SiO_2$ concentration at 25° C. and then reducing the pH by adding an acid. As illustrated in FIG. 3, in the water treatment system of this embodiment, the $SiO_2$ concentration of deposited soluble silica is at a minimum when the pH of the water to be treated 11 is 9, and when the pH is less than 9 or the pH is greater than 9, the $SiO_2$ concentration of deposited soluble silica tends to increase.

Figure 4:
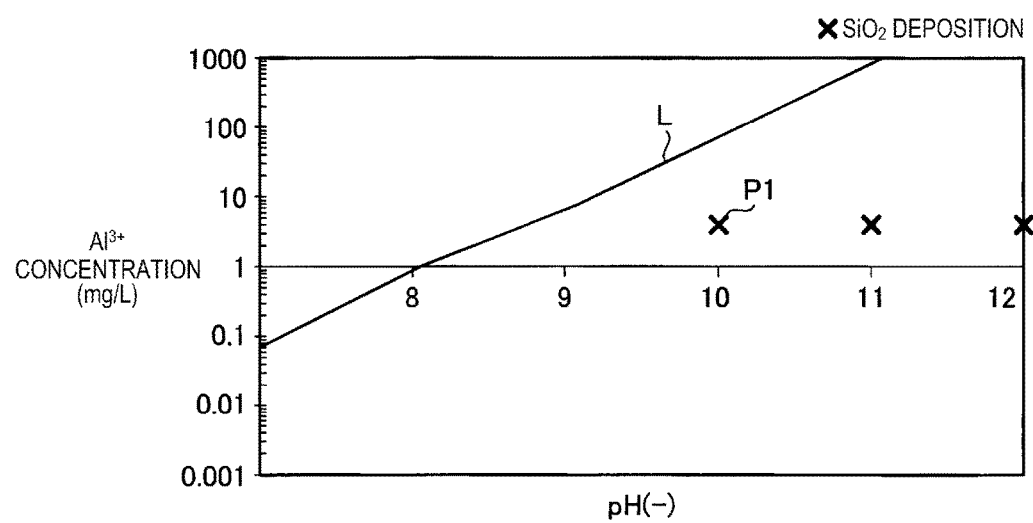
FIG. 4 is an explanatory diagram illustrating the solubility of soluble silica in the presence of aluminate ions.

FIG. 4 is an explanatory diagram illustrating the solubility of soluble silica in the presence of aluminate ions. The example illustrated in FIG. 4 is an example in which the pH is varied in a state in which the concentration of a saturated solution of soluble silica is 200 mg/L at pH 9 in FIG. 3. The straight line L in FIG. 4 represents the saturated solubility of aluminate ions serving as an aluminate ion additive. As illustrated in FIG. 4, the solubility of aluminate ions (displayed logarithmically) is inversely proportional to pH, and the solubility of aluminate ions also increases as the pH increases (see the straight line L of FIG. 4). Here, under conditions in which aluminate ions are not present (FIG. 3), a state in which the soluble silica is dissolved is maintained when the pH of the water to be treated 11 is 10, but in the presence of aluminate ions (FIG. 4), soluble silica is deposited as a deposit at pH 10. That is, even in a state equal to or lower than the saturated solubility of soluble silica illustrated in FIG. 3, soluble silica is deposited as a deposit in the presence of aluminate ions (see point P1 in FIGS. 3 and 4). This result may be due to the fact that since sodium aluminate and soluble silica formed a compound, the solubility of the soluble silica decreased, and the compound of sodium aluminate and soluble silica was deposited as a deposit.

Figure 5A:
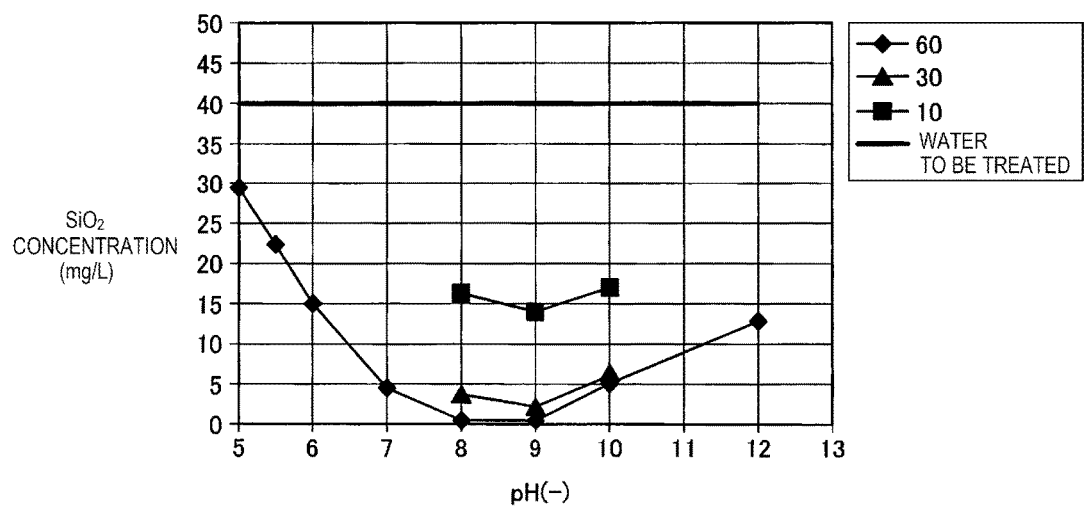
FIG. 5A illustrates the relationship between the pH of water to be treated after the addition of aluminum ions and the concentration of $SiO_2$.
Figure 5B:
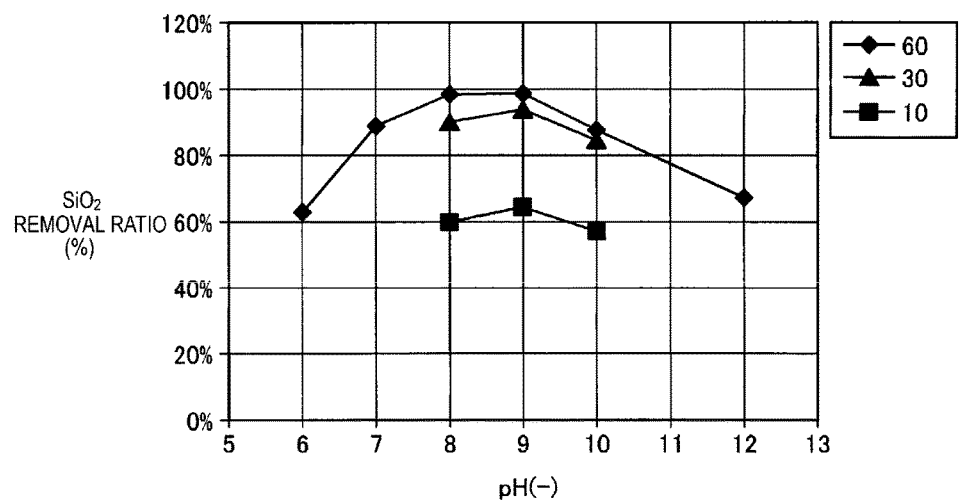
FIG. 5B illustrates the relationship between the pH of water to be treated after the addition of aluminum ions and the removal ratio of $SiO_2$.

FIG. 5A illustrates the relationship between the pH of water to be treated after the addition of aluminum ions and the concentration of $SiO_2$, and FIG. 5B illustrates the relationship between the pH of water to be treated 11 after the addition of aluminum ions and the removal ratio of $SiO_2$. The examples illustrated in FIGS. 5A and 5B are examples in which the concentration of $SiO_2$ in the water to be treated was set to 40 mg/L at a temperature of 25° C. and the aluminum concentration was set to 10 mg/L, 30 mg/L, and 60 mg/L. As illustrated in FIGS. 5A and 5B, it can be seen that in contrast to the case in which the aluminum concentration in the water to be treated 11 is 10 mg/L, the concentration of $SiO_2$ in the water to be treated 11 dramatically decreases and the $SiO_2$ removal ratio dramatically improves at an aluminum concentration of 30 mg/L. In addition, it can be seen that an equivalent $SiO_2$ concentration and removal ratio equivalent are achieved in the case in which the aluminum concentration in the water to be treated 11 is 30 mg/L and the case in which the aluminum concentration is 60 mg/L. It can be seen from these results that a soluble silica removing effect is achieved when the aluminum concentration in the water to be treated 11 is at least 10 mg/L and that the aluminum concentration is preferably at most 30 mg/L and more preferably at most 20 g/L from the perspective of the soluble silica removal efficiency and the perspective of reducing the used amount of the aluminate ion additive that is added as necessary.

In addition, when the pH of the water to be treated 11 after the addition of aluminum ions is in the range of less than 5.5, the concentration of $SiO_2$ tends to increase, whereas when the pH is in the range of at least 5.5, the concentration of $SiO_2$ rapidly decreases to 25 mg/L or lower, while the $SiO_2$ removal efficiency increases sharply. It can also be seen that when the pH exceeds 9, the concentration of $SiO_2$ once again increases and the removal efficiency of $SiO_2$ tends to decrease.

Figure 6:
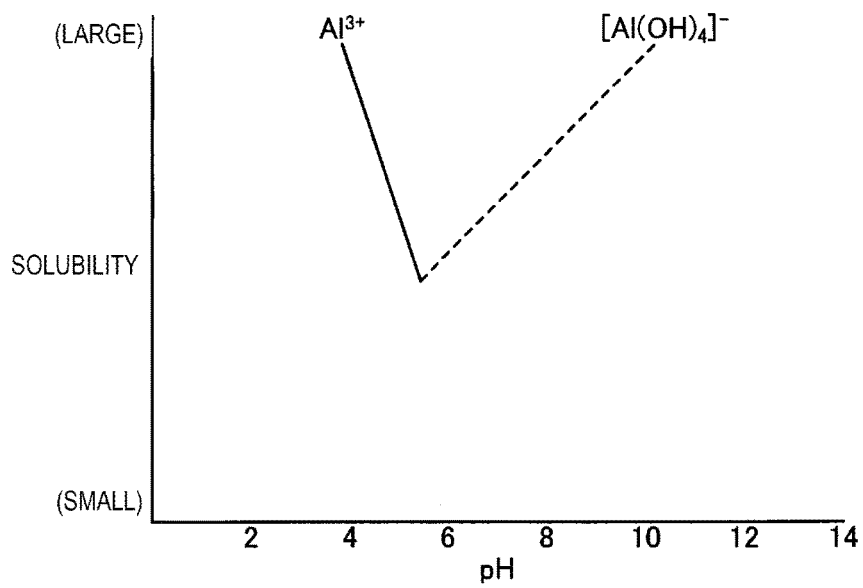
FIG. 6 illustrates the relationship between the pH of aluminum ions and solubility.

FIG. 6 illustrates the relationship between the pH of aluminum ions and solubility. This may be because the behavior of aluminum varies around pH 5.5 as a border line, wherein at pH 5.5 or lower, it exists as $Al^{3+}$, while at pH 5.5 or higher, it exists as $[Al(OH)_4]^-$, so when silica is present within a pH range of 5.5 or higher, a compound of $[Al(OH)_4]^-$ and soluble silica ($SiO_2$) is formed, and the deposition of deposits occurs.

Taking the above into consideration, the pH of the water to be treated 11 is preferably at least 5.5, more preferably at least 6, even more preferably at least 7, and even more preferably at least 8 and preferably at most 13, more preferably at most 12, even more preferably at most 11, and even more preferably at most 10.5 from the perspective of efficiently reducing the concentration of soluble silica in the water to be treated 11. Taking the above into consideration, the pH range is preferably from 5.5 to 12, more preferably from 7 to 11, and even more preferably from 8 to 10.

Figure 7:
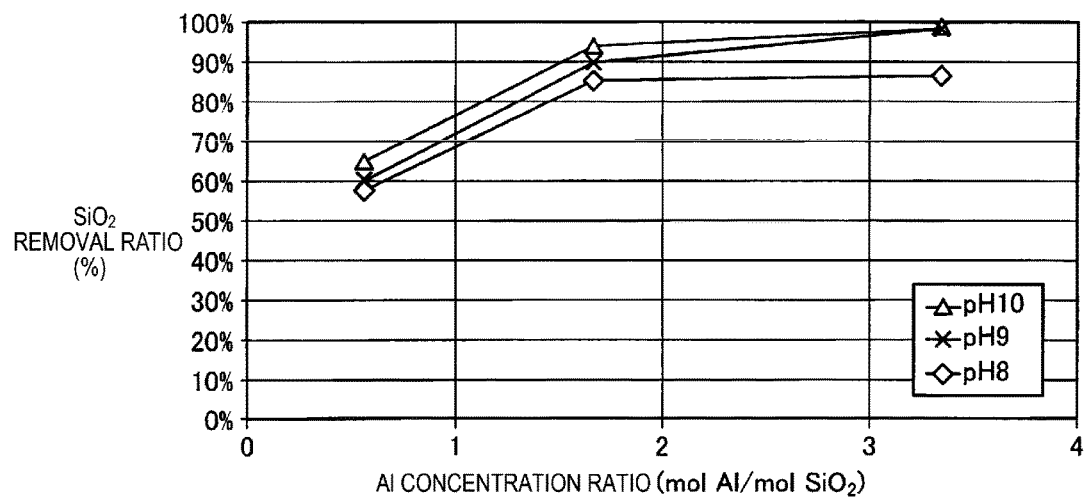
FIG. 7 illustrates the relationship between the concentration ratio of silica and aluminum and the $SiO_2$ removal ratio.

FIG. 7 illustrates the relationship between the concentration ratio of silica and aluminum (mol Al/mol $SiO_2$) and the $SiO_2$ removal ratio. The example illustrated in FIG. 7 illustrates cases in which the pH of the water to be treated was set to 8, 9, and 10. As illustrated in FIG. 7, the $SiO_2$ removal ratio is approximately 60% when the concentration ratio of aluminum is approximately 0.6 (mol Al/mol $SiO_2$), but when the concentration ratio of aluminum is 1.0 or higher, the $SiO_2$ removal ratio improves dramatically, and when the concentration ratio of aluminum is 1.7 (mol Al/mol $SiO_2$), the removal ratio is 90%. It is also clear that a high $SiO_2$ removal ratio is maintained even when the concentration ratio of aluminum increases further.

In the water treatment system 10A of this working example, the aluminate ion concentration ratio with respect to the water to be treated 11 is preferably such that the concentration ratio of aluminum ions to soluble silica (mol Al/mol $SiO_2$) is at least 0.5, more preferably at least 1.0, and even more preferably at least 1.5 and preferably at most 5.0, more preferably at most 4.0, and even more preferably at most 3.0 from the perspective of the soluble silica removal ratio and the perspective of reducing the used amount of the aluminate ion additive.

In addition, a flocculant mixing part 15c may be provided on the downstream side of the aluminate ion addition part 14c. This flocculant mixing part 15c accelerates the solid/liquid separation of the water to be treated 11 by adding a flocculant 15a to the water to be treated 11. Examples of the flocculant 15a include iron-based flocculants (such as $FeCl_3$)

and polymer flocculants. The added amount of the flocculant 15a is controlled by the control device 51 via the valve $V_7$.

The first precipitation part 16 is not particularly limited as long as it precipitates and separates deposits from the water to be treated 11. This first precipitation part 16 comprises a precipitation tank 16a for precipitating a deposit in the water to be treated 11 and a solid/liquid separation part 16c for performing solid/liquid separation on a precipitate 16b precipitated by the precipitation tank 16a.

The precipitate 16b from the precipitation tank 16a is fed to a solid/liquid separation part 16c such as a belt filter, for example, where a deposit 16d is separated, and a separated liquid 16e from which the deposit 16d is separated is returned by a return line 16f to the region between the precipitation tank 16a and the first pH adjustment part 17c.

This deposit 16d contains a compound of $[Al(OH)_4]^-$ and soluble silica ($SiO_2$). Therefore, the removal of the deposit 16d of soluble silica in the water to be treated 11 is achieved by performing solid/liquid separation treatment on the precipitate 16b precipitated by the precipitation tank 16a.

The first pH adjustment part 17c adjusts the pH of the water to be treated 11 to a prescribed range (pH 5 to 7) by adding a first pH adjusting agent 17a such as various acids to the water to be treated 11 from which the deposit 16d has been separated by the first precipitation part 16.

Examples of the first pH adjusting agent 17a include various acids such as hydrochloric acid, sulfuric acid, and citric acid. The added amount of the first pH adjusting agent 17a is controlled by the control device 51 via the valve $V_4$.

The pH adjustment by the first pH adjustment part 17c is preferably on the acidic side within a range of pH 5 to 7. This is to deposit the aluminate ions dissolved in the water to be treated 11 as salts and to reduce the amount of the residual aluminate ion additive 14a.

As described above, at pH 5.5 or lower, the aluminate ion exists as $Al^{3+}$, and at pH 5.5 or higher, it exists as $[Al(OH)_4]^-$, so within a range of pH 5.5 or higher, an "aluminum silica (Al—$SiO_2$) compound" of $[Al(OH)_4]^-$ and soluble silica ($SiO_2$) is formed.

The first solid/liquid separation part 18A performs membrane separation on the deposit in the water to be treated 11 having a pH adjusted to a prescribed first pH level (pH 5 to 7). The first solid/liquid separation part 18A is equipped with a membrane separation part 18a such as an ultrafiltration membrane (UF membrane) or a microfiltration membrane (MF membrane), for example so as to separate a residual deposit in the water to be treated 11. A separated liquid 18b that is separated by the membrane separation part 18a is fed to a solid/liquid separator (for example, a belt filter or the like) 18c, where solid content such as a deposit (Si/Al-based deposit) 18d is separated, and a separated liquid 18e from which the deposit 18d is separated is returned by a return line 18f to the region between the first pH adjustment part 17c and the first solid/liquid separation part 18A.

The second pH adjustment part 19c is provided on the downstream side of the first solid/liquid separation part 18A so as to adjust the pH in the water to be treated 11 to a second pH level (at most pH 5) on the acidic side by supplying a second pH adjusting agent 19a from a second pH adjusting agent supply part 19b to the water to be treated (permeated water) 11 from the first solid/liquid separation part 18A.

The reason for setting the second pH level to at most pH 5 is that when the first pH level in the first pH adjustment part 17c is 7 and the second pH level in the second pH adjustment part 19c is adjusted to the range of 7 to 5, as illustrated in FIG. 6, there is a risk that the saturated solubility of aluminum (Al) will decrease and that the deposition of $Al(OH)_3$ will be accelerated. Therefore, the pH is set to at most 5 so as to form aluminum ions ($Al^{3+}$) and to establish a dissolved state, which suppresses the deposition of $Al(OH)_3$ and prevents the blocking of the first separation membrane (desalination treatment) apparatus 23A of the subsequent stage.

Examples of the second pH adjusting agent 19a include various acids such as hydrochloric acid, sulfuric acid, and citric acid. The added amount of the second pH adjusting agent 19a is controlled by the control device 51 via the valve $V_5$.

The first antiscalant addition part 20c supplies an antiscalant 20a to the water to be treated 11 after the second pH adjustment from a first antiscalant supply part 20b as necessary. The added amount of the antiscalant 20a is controlled by the control device 51 via the valve $V_6$.

Here, the antiscalant 20a supplied to the water to be treated 11 is an agent having a function of suppressing the production of crystal nuclei in the water to be treated 11 and suppressing crystal growth by adsorbing to the surface of crystal nuclei contained in the water to be treated 11 (seed crystals, small-diameter scale deposited in excess of the saturated concentration, or the like).

In addition, the antiscalant 20a also has a function of dispersing particles in water such as deposited crystals (function of preventing deposition). The antiscalant 20a used in this working agent prevents the deposition of scale containing calcium in the water to be treated 11. This will be called a "calcium antiscalant" hereafter.

The calcium antiscalant has a function of suppressing the crystal nucleus production of gypsum or calcium carbonate in the water to be treated 11 and a function of suppressing the crystal growth of gypsum or calcium carbonate by adsorbing to the surface of crystal nuclei of gypsum or calcium carbonate contained in the water to be treated 11 (seed crystals or small-diameter scale deposited in excess of the saturated concentration). Alternatively, there are also antiscalants having a function of dispersing particles in waste water such as deposited crystals (function of preventing deposition).

Here, examples of calcium antiscalants include phosphonic acid-based antiscalants, polycarboxylic acid-based antiscalants, and mixtures thereof. A specific example is FLO-CON260 (trade name, produced by BWA).

In addition, when $Mg^{2+}$ is contained in the water to be treated 11, an antiscalant which prevents the deposition of scale containing magnesium (for example, magnesium hydroxide, magnesium carbonate, and magnesium sulfate) in the water to be treated 11 can be used. This will be called a "magnesium antiscalant" hereafter. Examples of magnesium antiscalants include polycarboxylic acid-based antiscalants and the like.

A reverse osmosis membrane apparatus (RO) equipped with a reverse osmosis membrane, for example, can be used as the first separation membrane apparatus 23A. The first separation membrane apparatus 23A transmits the water to be treated 11 from which soluble silica has been removed to a reverse osmosis membrane so as to separate the water to be treated 11 into first recycled water 21A and first concentrated water 22A.

In the water treatment system, a treated water purification apparatus based on a method other than a filtration method using a reverse osmosis membrane may also be used as long as the water to be treated 11 can be purified. A nanofiltration membrane (NF), an electrodialysis (ED) equipment, an electrodialysis reversal (EDR) equipment, an electrodeionization apparatus (EDI), an electrostatic desalination apparatus (CD1), an evaporator, and deposition apparatus, an ion exchange resin, and the like, for example, can be used as a treated water purification apparatus.

Figure 2:
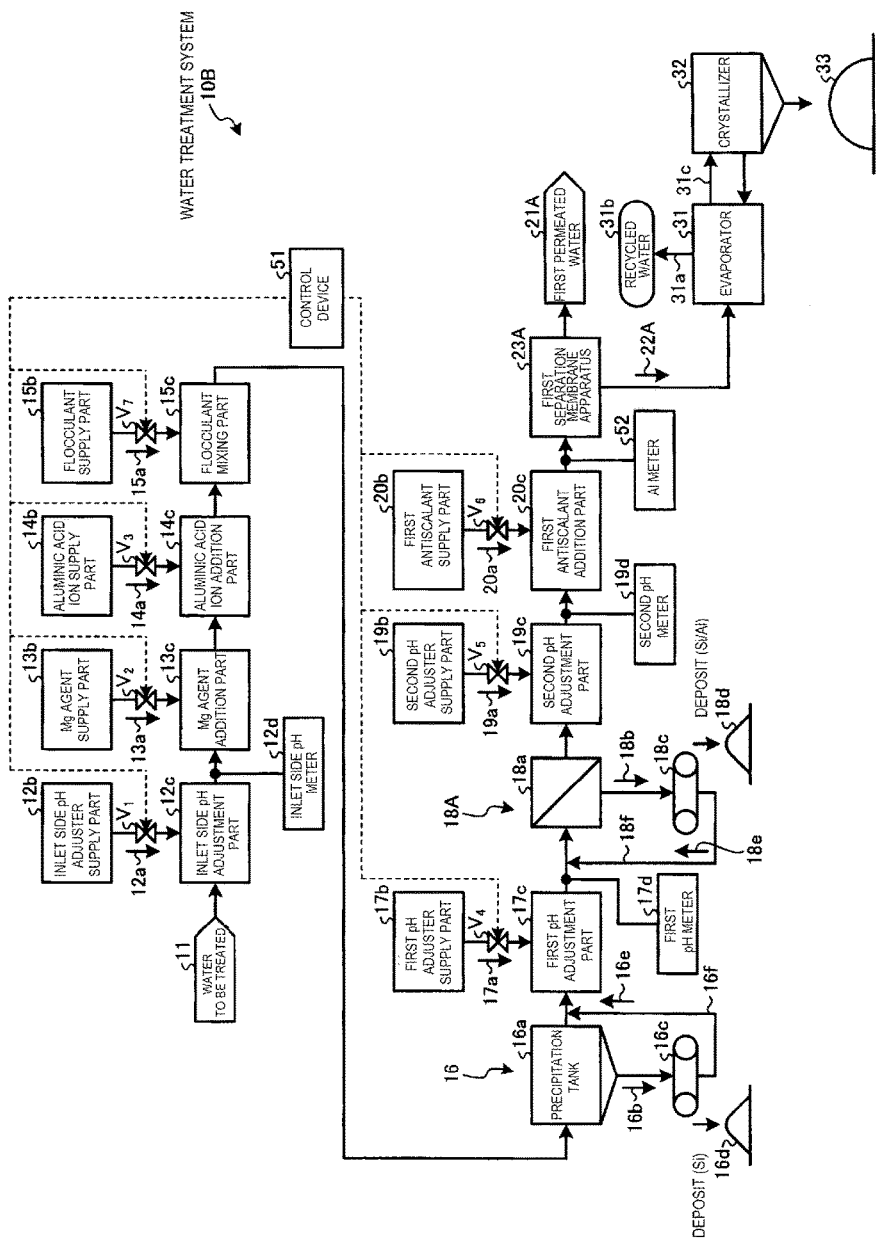
FIG. 2 is a schematic view of another water treatment system of Working Example 1.

FIG. 2 is a schematic view of another water treatment system of Working Example 1. The water treatment system 10B illustrated in FIG. 2 is one in which a concentration apparatus such as an evaporator 31, for example, for recycling water from the first non-permeated water 22A separated by the first separation membrane apparatus 23A is installed in the water treatment system 10A of FIG. 1. Steam 31a from the evaporator 31 is condensed so as to produce recycled water 31b.

The concentrated water 31c that is concentrated by the evaporator 31 further produces sludge 33 with a crystallizer 32.

The control device 51 is realized, for example, using a general-purpose or specialized computer such as a CPU (central processing unit), a ROM (Read Only Memory), or a RAM (Random Access Memory) and a program which operates on the computer. The control device 51 controls the pH of the water to be treated 11 by adjusting the degree of opening of the valve $V_1$ based on the pH of the water to be treated 11 measured by the inlet side pH meter 12d and changing the added amount of the inlet side pH adjusting agent 12a with respect to the water to be treated 11.

In addition, the control device 51 controls the pH of the water to be treated 11 within the range of the first pH level (pH 5 to 7) by adjusting the degree of opening of the valve $V_4$ based on the pH of the water to be treated 11 measured by the first pH meter 17d and changing the added amount of the first pH adjusting agent 17a with respect to the water to be treated 11.

Further, the control device 51 controls the pH of the water to be treated 11 to the second pH level (at most pH 5) by adjusting the degree of opening of the valve $V_5$ based on the pH of the water to be treated 11 measured by the second pH meter 19d and changing the added amount of the second pH adjusting agent 19a with respect to the water to be treated 11.

In addition, the control device 51 controls the aluminum ion concentration in the water to be treated 11 by adjusting the degree of opening of the valve $V_3$ based on the aluminum concentration in the water to be treated 11 measured by the aluminum concentration meter (Al meter) 52 and changing the added amount of the aluminate ion additive 14a with respect to the water to be treated 11.

Further, the control device 51 controls the magnesium ion concentration in the water to be treated 11 by adjusting the degree of opening of the valve $V_2$ based on the aluminum concentration in the water to be treated 11 measured by the Al meter 52 and changing the added amount of the Mg agent 13a with respect to the water to be treated 11.

In addition, the control device 51 controls the added amount of the antiscalant 20a with respect to the water to be treated 11 by adjusting the degree of opening of the valve $V_6$.

Further, the control device 51 changes and controls the added amount of the flocculant 15a with respect to the water to be treated 11 by adjusting the degree of opening of the valve $V_7$.

Next, the overall operation of the water treatment system 10A of this working example will be described.

In the water treatment system 10A of this working example, the water to be treated 11 (for example, pH 6.5) containing soluble silica of cooling water or the like of a plant apparatus, for example, is controlled so that the pH is within a prescribed range (for example, pH 8 to 10) as a result of the inlet side pH adjusting agent 12a being added to the inlet side pH adjustment part 12c from the inlet side pH adjusting agent supply part 12b as necessary.

The magnesium ion additive 13a is then added to the Mg agent addition part 13c from the Mg agent supply part 13b as necessary so that the magnesium ion concentration is adjusted to within a prescribed range.

Next, the aluminate ion additive 14a is added to the water to be treated 11 by the aluminate ion addition part 14c from the aluminate ion supply part 14b as necessary. As a result, the aluminate ion concentration and pH of the water to be treated 11 are adjusted to within prescribed ranges, so soluble silica is deposited within the aluminate ion addition part 14c.

Here, the control device 51 controls the degrees of opening of the valves $V_1$ and $V_2$ so that the pH of the water to be treated 11 that is introduced into the first precipitation part 16 is within a prescribed range (for example, pH 8 to 10) and so that the magnesium ion concentration is within a prescribed range. The control device 51 controls the added amount of aluminate ions by controlling the degree of opening of the valve $V_3$ so that the aluminum ion concentration in the water to be treated 11 measured by the Al concentration meter 52 is within a prescribed range.

The flocculant 15a is then added to the flocculant mixing part 15c from the flocculant supply part 15b as necessary so that the flocculant concentration of the water to be treated 11 is adjusted to within a prescribed range.

The water to be treated 11 is then introduced into the precipitation tank 16a of the first precipitation part 16, and the precipitate 16b precipitated inside the precipitation tank 16a is separated by the solid/liquid separation part (for example, a belt filter or the like) 16c so as to form a deposit 16d of soluble silica.

The water to be treated 11 in which soluble silica is deposited is introduced into the first pH adjustment part 17c, and the first pH adjusting agent 17a is added from the first pH adjusting agent supply part 17b so that the first pH level is controlled to within a prescribed range (for example, pH 5 to 7). By using this pH range, it is possible to deposit residual aluminate ions.

The water to be treated 11 is then introduced into the first solid/liquid separation part 18A, and a deposit is removed as solid content by a membrane filtration apparatus or the like.

The second pH adjusting agent 19a is then added to the second pH adjustment part 19c from the second pH adjusting agent supply part 19b as necessary so that the pH is controlled to within the second pH level (at most pH 5).

Next, the antiscalant 20a is added to the first antiscalant addition part 20c from the first antiscalant supply part 20b as necessary so that the antiscalant concentration is adjusted to within a prescribed range.

The water to be treated 11 to which the second pH adjusting agent 19a and the antiscalant 20a are added is desalinated by a reverse osmosis membrane, for example, of the first separation membrane apparatus 23A and is separated into first recycled water 21A and first concentrated water 22A.

In the water treatment system 10B of this embodiment, recycled water 31b is produced by evaporating water and condensing steam 31a with the evaporator 31 from the first non-permeated water 22A serving as concentrated water separated by the first separation membrane apparatus 23A in the water treatment system 10A. This makes it possible to realize the non-draining treatment of the first non-permeated water 22A.

As described above, according to the water treatment system 10A of this embodiment, a deposit of an aluminum silica (Al—SiO$_2$) compound produced by a reaction between aluminate ions and soluble silica present in the water to be treated 11 with a pH and aluminate ion concentration within prescribed ranges can be efficiently removed by the first precipitation part 16, which makes it possible to efficiently remove soluble silica in the water to be treated 11. Next, by setting the pH to the first pH level (pH 5 to 7) with the first pH adjustment part 17c, it is possible to remove the unreacted residual aluminate ion additive 14a in the water to be treated 11. Next, by setting the pH to the second pH level (at most pH 5), it is possible to convert the residual aluminate ion additive 14a in the water to be treated 11 to an aluminum ion (Al$^{3+}$) so as to form a dissolved state and to suppress the deposition of Al(OH)$_3$ so as to prevent the blockage of the first separation membrane (desalination treatment) apparatus 23A of the subsequent stage.

Embodiment 2

The water treatment system of Working Example 2 of the present invention will be described hereinafter with reference to the drawings.

Figure 8:
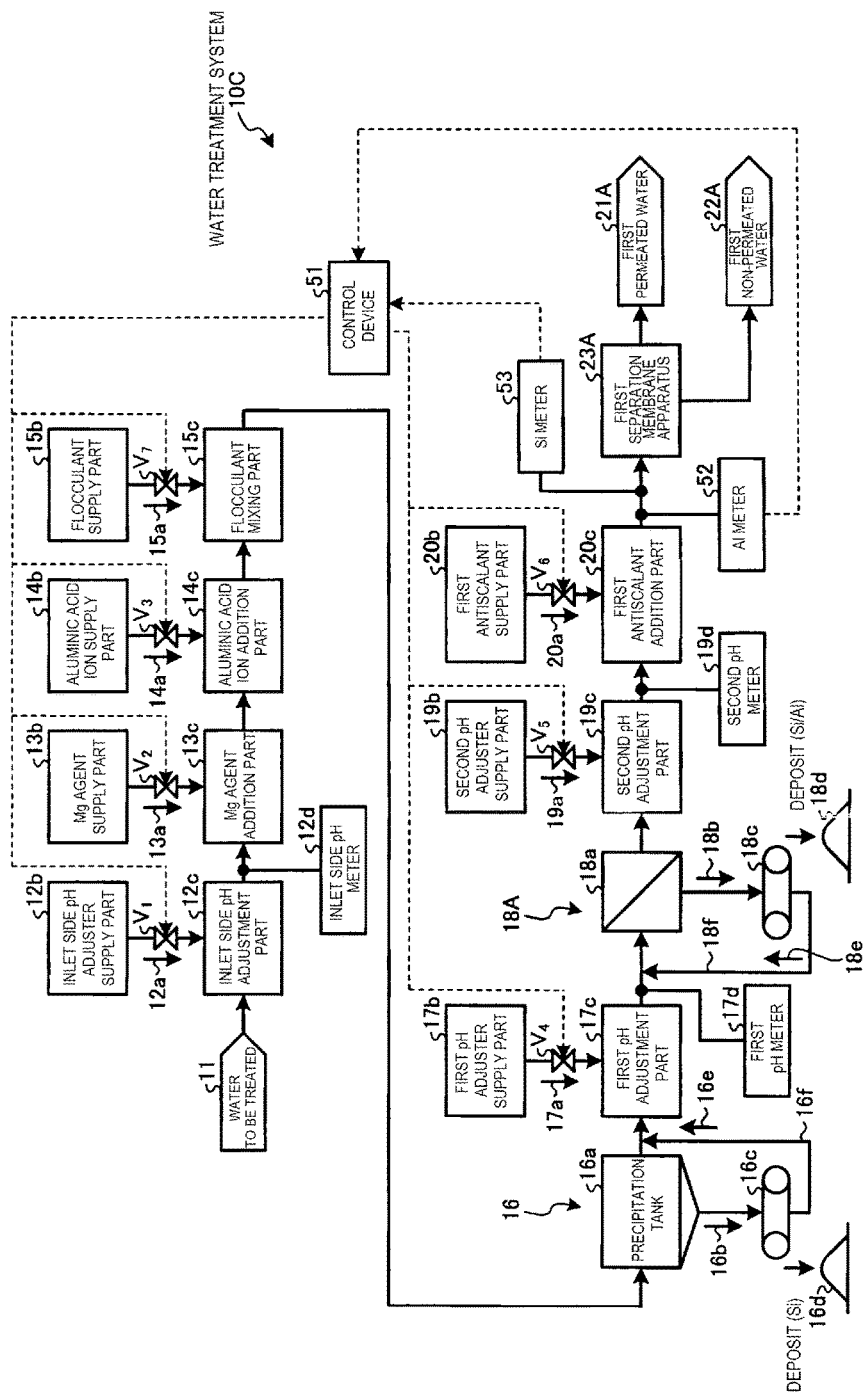
FIG. 8 is a schematic view illustrating a water treatment system of Working Example 2.

FIG. 8 is a schematic view illustrating a water treatment system of Working Example 2. Note that members that are the same as those of the configuration of the water treatment system of Working Example 1 are labeled with the same symbols, and descriptions thereof are omitted.

As illustrated in FIG. 8, the water treatment system 10C of this working example is one in which the water treatment system 10A of Working Example 1 is equipped with: an aluminum concentration meter (Al meter) 52 for measuring the concentration of aluminum in the water to be treated 11 between the first solid/liquid separation part 18A and the first separation membrane apparatus 23A; a silica concentration meter (Si meter) 53 for measuring the concentration of silica in the water to be treated 11; and a control device 51 which, as a result of the monitoring of the silica concentration meter 53 and the aluminum concentration meter 52, changes to operating conditions in which the silica concentration and/or the aluminum concentration in the water to be treated 11 are set to at most a prescribed threshold. The aluminum concentration meter 52 and the silica concentration meter 53 may be installed anywhere as long as they are between the first solid/liquid separation part 18A and the first separation membrane apparatus 23A.

When the silica concentration of influent water flowing into the first separation membrane apparatus 23A exceeds the prescribed threshold (silica concentration×concentration factor>silica deposition concentration) according to the silica concentration meter 53, an instruction is issued to the aluminate ion supply part 14b from the control device 51 so as to control the aluminate ion supply part 14b to increase the added amount of the aluminate ion additive 14a. As a result, the deposition of the aluminum silica (Al—SiO$_2$) compound is increased.

In addition, an instruction is issued to the flocculant supply part 15b from the control device 51 so as to control the flocculant supply part 15b to increase the added amount of the flocculant 15a. The solid/liquid separation effect is promoted by the effect of adding the flocculant 15a.

Further, when the silica concentration of the influent water flowing into the first separation membrane apparatus 23A exceeds the prescribed threshold (silica saturated solubility of 120 ppm) (silica concentration×concentration factor>silica deposition concentration), according to the silica concentration meter 53, the pH in the inlet side pH adjustment part 12c is adjusted to the inlet side pH level (pH 8 to 9) from the control device 51. As a result, the concentration of soluble silica in the water to be treated 11 is reduced efficiently. If the pH has already been adjusted to within this range, silica deposition is performed in accordance with the conditions described above so as to remove soluble silica.

In addition, when the aluminum concentration of influent water flowing into the first separation membrane apparatus 23A is equal to or greater than the prescribed threshold (membrane manufacturer standard: for example, 0.05 mg/L) according to the aluminum concentration meter 52, an instruction is issued to the aluminate ion supply part 14b from the control device 51 so as to control the aluminate ion supply part 14b to reduce the added amount of the aluminate ion additive 14a. As a result, the aluminum concentration in the water to be treated 11 is reduced.

In addition, when the aluminum concentration of influent water flowing into the first separation membrane apparatus 23A is equal to or greater than the prescribed threshold (membrane manufacturer standard: for example, 0.05 mg/L) according to the aluminum concentration meter 52, an instruction is issued to the second pH adjusting agent supply part 19b from the control device 51 so as to control the device so increase the added amount of the second pH adjusting agent 19a and to further reduce the current second pH level. That is, when the current second pH level is pH 5.0, for example, in the measurement performed by the second pH meter 19d, the pH is set to at most pH 4.5, for example, and the amount of aluminum dissolution is thereby further increased so as to prevent adhesion to the membrane.

According to this working example, when the silica concentration and/or the aluminum concentration in the influent water flowing into the first separation membrane apparatus 23A exceed the prescribed thresholds as a result of the monitoring of the silica concentration meter 53 and the aluminum concentration meter 52, a membrane separation operation with no membrane blockage can be performed by controlling the system with the prescribed thresholds and the control device 51.

Third Embodiment

The water treatment system of Working Example 3 of the present invention will be described hereinafter with reference to the drawings.

Figure 9:
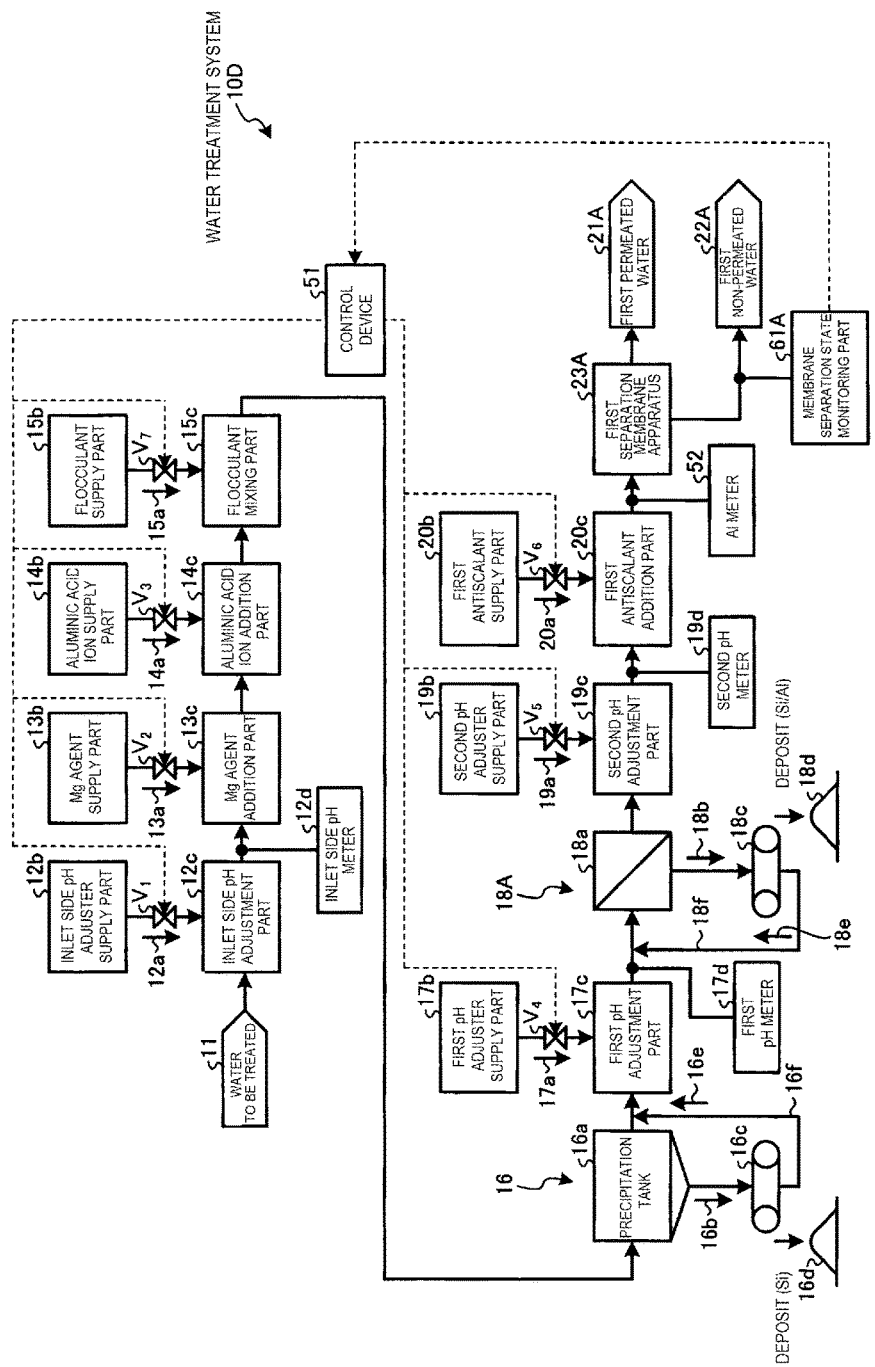
FIG. 9 is a schematic view illustrating a water treatment system of Working Example 3.

FIG. 9 is a schematic view illustrating a water treatment system of Working Example 3. Note that members that are the same as those of the configuration of the water treatment system of Working Example 1 are labeled with the same symbols, and descriptions thereof are omitted.

As illustrated in FIG. 9, the water treatment system 10D of this working example is equipped with: a membrane separation state monitoring part 61A for monitoring the desalination state of the first separation membrane apparatus 23A; and a control device 51 which, as a result of the monitoring of the membrane separation state monitoring part 61A, executes washing treatment on the first separation membrane apparatus 23A and/or changes to operating conditions in which adhered matter of the first separation membrane apparatus 23A does not adhere to the membrane.

The membrane separation state monitoring part 61A predicts the adhesion of the adhered matter of the first separation membrane apparatus 23A to the membrane and, based on this prediction, executes the washing treatment on the first separation membrane apparatus 23A or changes to operating conditions in which adhered matter of the first separation membrane apparatus 23A does not adhere to the membrane before the adhesion of adhered matter to the membrane actually occurs.

The specific content of the washing treatment performed on the first separation membrane apparatus 23A involves, for example, acid washing, alkali washing, water washing, or the like via a washing line (not illustrated). In addition, operating conditions under which adhered matter does not adhere to the membrane refer to a change in the operating conditions of the first separation membrane apparatus 23A, for example, such as the pressure, flow rate, or the concentration of the antiscalant 20a, for example.

Figure 10:
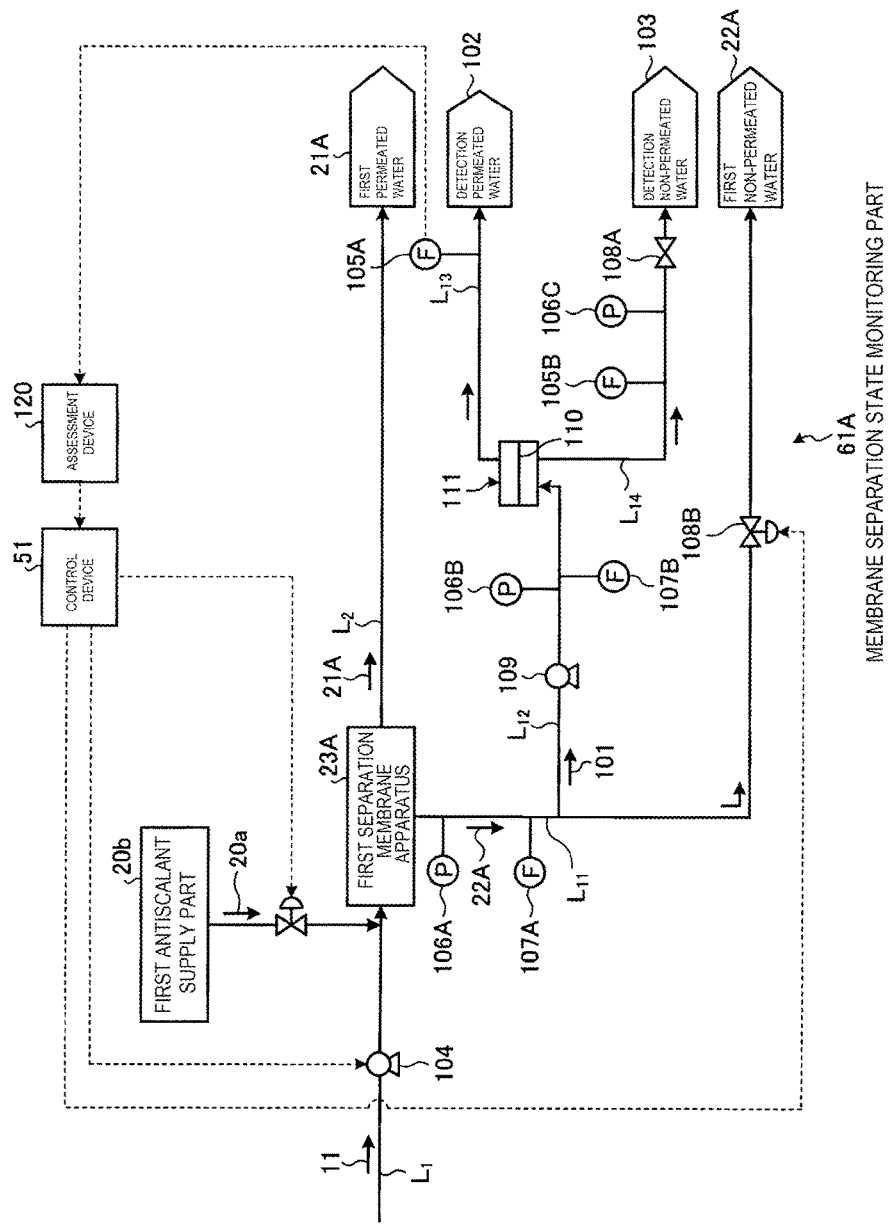
FIG. 10 is a schematic view of a membrane separation state monitoring part of Working Example 3.

FIG. 10 is a schematic view of a membrane separation state monitoring part of Working Example 3.

As illustrated in FIG. 10, the membrane separation state monitoring part 61A is equipped with: an adhered matter detection part 111 provided on a non-permeated water content branching line L12 which branches from a non-permeated water line L11 through which the first non-permeated water 22A having a concentrated soluble component is discharged and having a detection reverse osmosis membrane 110 for separating a detection liquid 101 separated from the first non-permeated water 22A into detection permeated water 102 and detection non-permeated water 103; an adhesion condition changing apparatus for changing the adhesion conditions of adhered matter on the detection reverse osmosis membrane 110; a detection permeated water side flow rate meter 105A and a detection non-permeated water side flow rate meter 105B for measuring the flow rate of the detection permeated water 102 and/or the detection non-permeated water 103 separated by the detection reverse osmosis membrane 110; and a control device 51 which, as a result of the measurements of the detection permeated water side flow rate meter 105A and the detection non-permeated water side flow rate meter 105B, executes washing treatment on the reverse osmosis membrane of the first separation membrane apparatus 23A and/or changes the operating conditions (for example, operating conditions such as the pressure, flow rate, or the concentration of the adhered matter preventing agent) so that the adhered matter of the first separation membrane apparatus 23A does not adhere to the membrane.

In FIG. 10, symbol 104 is a high-pressure pump for supplying the water to be treated 11 to the first separation membrane apparatus 23A; L1 is a water to be treated introduction line; L2 is a permeated water discharge line; 105A is a detection permeated water side flow rate meter; 105B is a detection non-permeated water side flow rate meter; 106A to 106C are pressure gauges; 107A and 10B are flow rate meters; 108A and 108B are adjustment valves; 109 is a high-pressure pump for supplying the detection liquid 101 to the adhered matter detection part 111; and 120 is an assessment apparatus.

Here, the first separation membrane apparatus 23A is an apparatus for producing the first permeated water 21A from the water to be treated 11 and therefore may also be called the "first separation membrane apparatus of this facility" hereafter.

Here, the adhesion condition changing apparatus is not particularly limited as long as it is an apparatus which changes the conditions under which the adhered matter of the detection reverse osmosis membrane 110 adhere to the membrane, and examples thereof include an adhesion condition changing apparatus which accelerates the adhesion of adhered matter and an adhesion condition changing apparatus which decelerates the adhesion of adhered matter. An adhesion condition changing apparatus which accelerates the adhesion of adhered matter, for example, will be described as an example hereinafter.

This adhesion condition changing apparatus further changes the desalination conditions of the adhered matter detection part 111 from the standard operating conditions of the first separation membrane apparatus 23A of this facility by means of a pressure adjustment or flow rate adjustment performed on the detection liquid 101, which is a part of the first non-permeated water 22A. For example, when the adhesion conditions are changed by means of a pressure adjustment, the adhesion condition changing apparatus is a pressure adjustment apparatus which changes the supply pressure of the branched detection liquid 101. Specifically, an adjustment valve 108A provided on a detection non-permeated water discharge line $L_{14}$ for discharging the detection non-permeated water 103 from the adhered matter detection part 111 is operated. In addition, the pressure of the detection liquid 101 may also be changed by operating the adjustment valve 108A and the high-pressure pump 109.

Next, without changing the concentration of the soluble components containing ions in the branched detection liquid 101, the supply pressure of the detection liquid 101 is changed (for example, the supply pressure of the detection liquid 101 is increased by adjusting the adjustment valve 108A), and the amount of the detection permeated water 102 of the detection reverse osmosis membrane 110 is measured so as to assess the presence or absence of adhered matter adhering to the first detection reverse osmosis membrane 101.

The assessment of the presence or absence of adhered matter is performed based on the results of measuring the flow rate of the first detection permeated water side flow rate meter 105A provided on the detection permeated water discharge line $L_{13}$ of the detection permeated water 102.

In this working example, the supply pressure of the detection liquid 101 supplied to the detection reverse osmosis membrane 110 of the adhered matter detection part 111 is increased by the adjustment valve 108A so as to increase the adhered matter adhering to the detection reverse osmosis membrane 110 in an accelerated manner, and the flow rate of the detection liquid 101 is adjusted by the high-pressure pump 109.

In the assessment of the adhesion of adhered matter, it is assessed that adhered matter has adhered to the detection reverse osmosis membrane 110 when the permeated water flow rate has changed by a prescribed percentage in a prescribed amount of time.

That is, when the adhesion conditions of adhered matter on the detection reverse osmosis membrane 110 are changed by the adhesion condition changing apparatus when measuring the detection permeated water 102 separated by the detection reverse osmosis membrane 110 of the adhered matter detection part 111, the matter of whether the flow rate of the detection permeated water 102 has changed from the prescribed conditions by a prescribed threshold (prescribed percentage of change in the flow rate in a prescribed amount of time) is assessed by measuring the flow rate with the first detection permeated water side flow rate meter 105A, and as a result of the measurement, the adhesion of the adhered matter of the first separation membrane apparatus 23A of this facility is assessed by the assessment apparatus 120.

The washing of the first separation membrane apparatus 23A of this facility and the changing of the operating conditions are then executed by the control device 51 based on the result of the assessment of the adhesion of adhered matter.

Here, in the membrane separation state monitoring part 61A, even if signs of the blockage of the separation membrane of the first separation membrane apparatus 23A are detected, the same phenomenon is detected for both aluminum and silica, so at least a silica concentration meter 53 is provided so as to assess whether the cause of the blockage is silica or aluminum.

Figure 11:
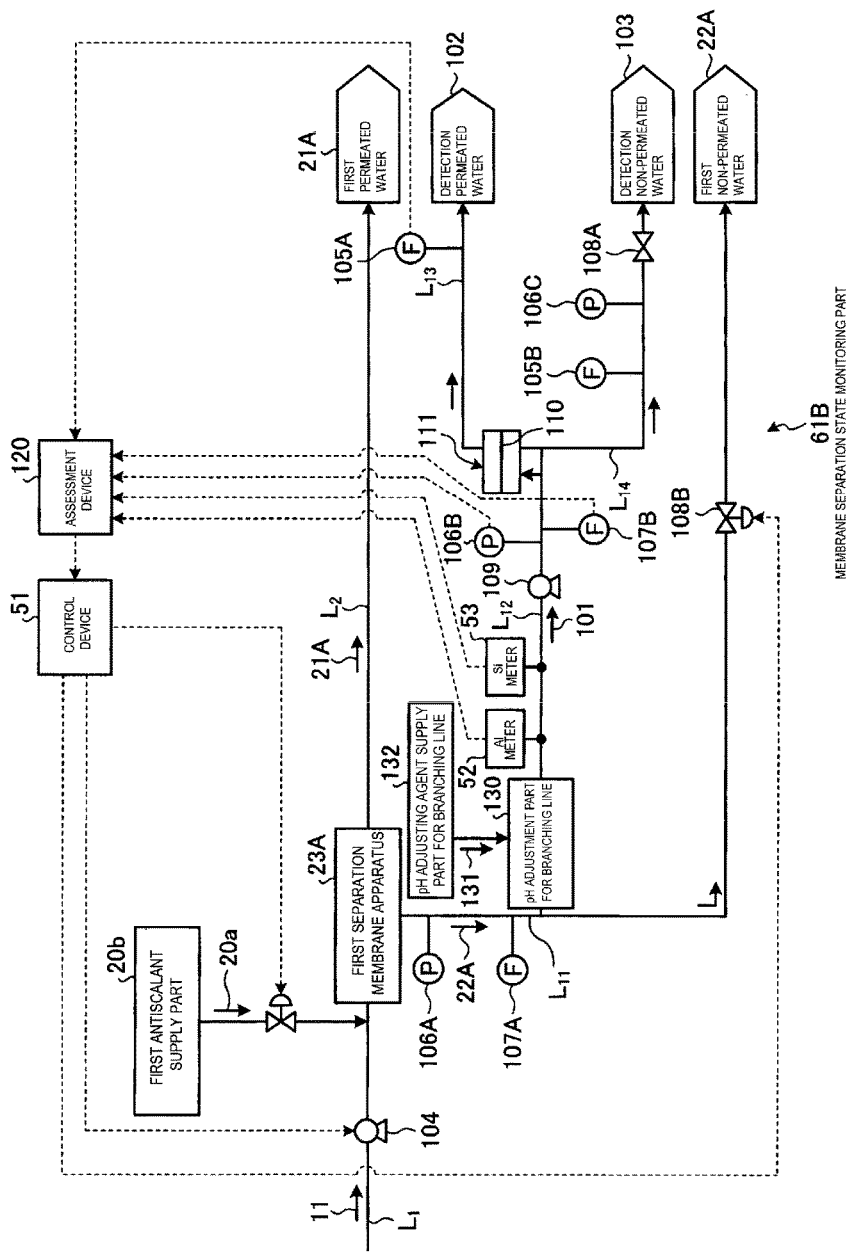
FIG. 11 is a schematic view of another membrane separation state monitoring part of Working Example 3.

FIG. 11 is a schematic view of another membrane separation state monitoring part of Working Example 3. As illustrated in FIG. 11, another membrane separation state monitoring part 61B of this embodiment may be provided with a pH adjustment part for branching line 130 on a branching line $L_{12}$ through which the branched detection liquid 101 flows. A pH adjusting agent 131 is then supplied to this pH adjustment part for branching line 130 from the pH adjusting agent supply part for branching line 132 so as to adjust the pH of the branched detection liquid 101 to the range of pH 5.5 to 9.

Figure 12:
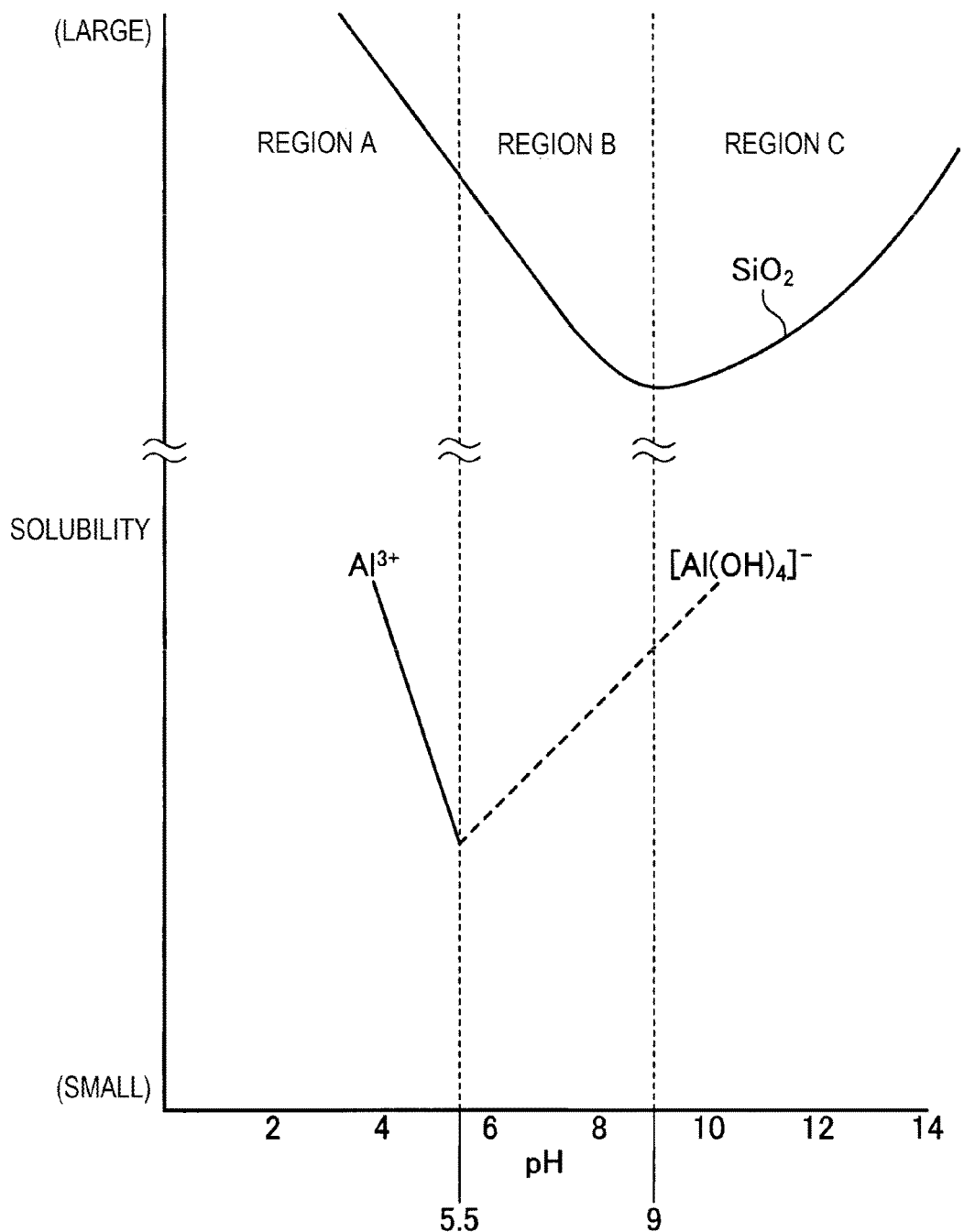
FIG. 12 schematically illustrates the relationship between solubility and the change in pH between silica ($SiO_2$) and aluminum ions ($Al^{3+}$, $[Al(OH)_4]^-$).

FIG. 12 schematically illustrates the relationship between solubility and the change in pH between silica ($SiO_2$) and aluminum ions ($Al^{3+}$, $[Al(OH)_4]^-$). There is a difference in solubility between silica and aluminum, but this is a schematic diagram focusing on the behavior of the pH.

As illustrated in the lower graph of FIG. 12, the behavior of aluminum ions varies around pH 5.5 as a border line, wherein at pH 5.5 or lower, it exists as $Al^{3+}$, while at pH 5.5 or higher, it exists as $[Al(OH)_4]^-$. Therefore, in the range of at least pH 5.5 (regions B and C), a compound of $[Al(OH)_4]^-$ and soluble silica ($SiO_2$) is formed, and there is deposit deposition. As illustrated in the upper graph of FIG. 12, the solubility of silica varies around pH 9 as a border line.

The behavior of the solubility of silica and aluminum when the pH level decreases is shown in Table 1 below based on the graphs of FIG. 12.

When the pH level of region A of FIG. 12 is 5.5 or lower, the solubility of silica and the solubility of aluminum both increase. When the pH level of region B is from 5.5 to 9, the solubility of silica increases, but the solubility of aluminum decreases. In addition, when the pH level of region C is 9 or higher, the solubility of silica and the solubility of aluminum both decrease.

TABLE 1

| Region | pH level | Behavior of solubility when the pH level decreases | |
|---|---|---|---|
| | | Al | $SiO_2$ |
| A | 5.5 or lower | ↗ (Increase) | ↗ (Increase) |
| B | 5.5 to 9 | ↘ (Decrease) | ↗ (Increase) |
| C | 9 or lower | ↘ (Decrease) | ↘ (Decrease) |

Therefore, measurements are taken by the aluminum concentration meter 52 and the silica concentration meter 53, and when "silica is rate-limiting", control is executed to adjust the pH of the inlet side pH adjustment part 12c to 8 to 9 or to increase the Mg additive 13a. As a result, the deposition of silica is suppressed.

In addition, when "aluminum is rate-limiting", the pH is adjusted by the first pH adjustment part 17c and the second pH adjustment part 19c so as to adjust the pH level to an even lower level than the current pH level. As a result, the deposition of aluminum is suppressed.

In FIG. 11, once a prescribed amount of time has passed after the pH of the detection liquid 101 is adjusted to pH 7, for example, an operation is performed to slightly (for example, 0.5) reduce the pH (pH 6.5), and the change in the flux of the adhered matter detection part 111 is confirmed by the detection permeated water side flow rate meter 105A.

When the flux increases, it is assessed that silica ($SiO_2$) is rate-limiting, whereas when the flux decreases, it is assessed that aluminum (Al) is rate-limiting.

Embodiment 4

The water treatment system of Working Example 4 of the present invention will be described hereinafter with reference to the drawings.

Figure 13:
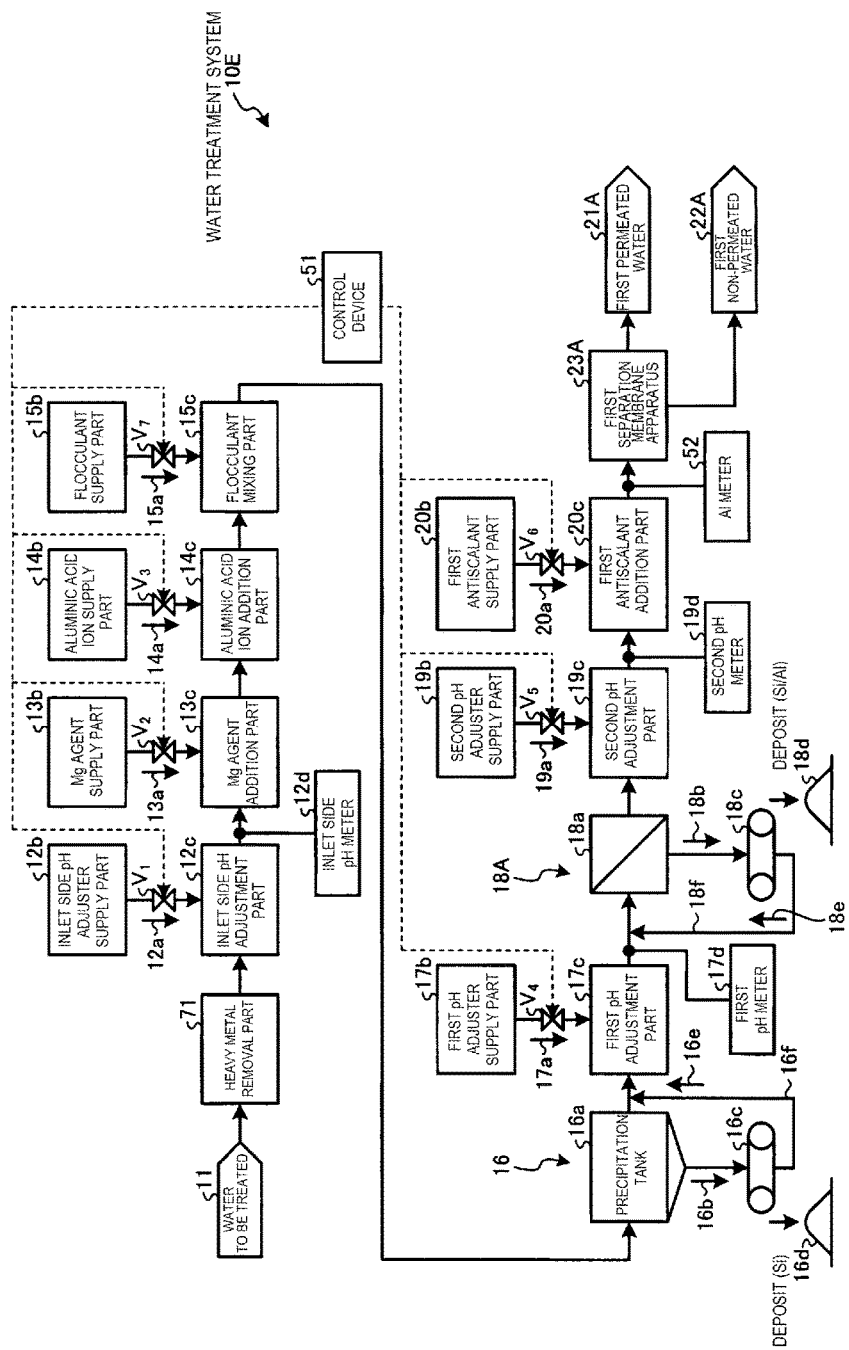
FIG. 13 is a schematic view illustrating a water treatment system of Working Example 4.

FIG. 13 is a schematic view illustrating a water treatment system of Working Example 4. Note that members that are the same as those of the configuration of the water treatment system of Working Example 1 are labeled with the same symbols, and descriptions thereof are omitted.

As illustrated in FIG. 13, the water treatment system 10E of this working example is equipped with a heavy metal removal part 71 for removing heavy metals from the water to be treated 11 in the water treatment system 10A of FIG. 1 on the upstream side of the inlet side pH adjustment part 12c.

As water to be treated 11, heavy metals may be contained in the desulfurization waste water from a desulfurization apparatus, for example, so the heavy metals in the water to be treated 11 are treated with the heavy metal removal part 71.

Examples of the heavy metal removal part 71 include a heavy metal removal apparatus which utilizes oxidation by adding an oxidant, a heavy metal removal apparatus which utilizes precipitation by adding a flocculant, a heavy metal removal apparatus which utilizes hydroxide precipitation in which the pH is adjusted and heavy metals are deposited as hydroxides, and a heavy metal removal apparatus which solidifies heavy metals with a heavy metal scavenger, a chelating agent, or the like.

Here, a heavy metal removal apparatus which utilizes oxidation by adding an oxidant solidifies iron or manganese (colloidal form, soluble, ions, or the like) by means of oxidation with an oxidant and then removes the iron or manganese by precipitation/filtration in a subsequent stage. A heavy metal removal apparatus which utilizes precipitation by adding a flocculant coagulates/solidifies heavy metals with a flocculant such as an iron salt or an aluminum salt and then removes the heavy metals by precipitation/filtration in a subsequent stage. A heavy metal removal apparatus which utilizes hydroxide precipitation adjusts the pH to a level at which the solubility of heavy metals (hydroxides or the like) becomes small so as to deposit the heavy metals as hydroxides and then remove the heavy metals by precipitation/filtration in a subsequent stage. A heavy metal removal apparatus which solidifies heavy metals with a chelating agent or the like solidifies heavy metals using a heavy metal scavenger, a chelating agent, a chelating resin, or the like and then separates the heavy metals in a subsequent stage. Alternatively the apparatus separates heavy metals by means of adsorption on a chelating resin. Any one of these may be used alone, or two or more may be used in combination.

In addition, a solid/liquid separation apparatus, a precipitation apparatus, and a filtration apparatus may be provided individually on each separation part or may be also used as the first precipitation part 16 and the first solid/liquid separation part 18A.

According to this working example, the heavy metals in the dense desulfurization waste water are pretreated, and the same operations as in Working Example 1 are then performed to deposit and treat the soluble silica so that the water can be recycled.

Embodiment 5

The water treatment system of Working Example 5 of the present invention will be described hereinafter with reference to the drawings.

Figure 14:
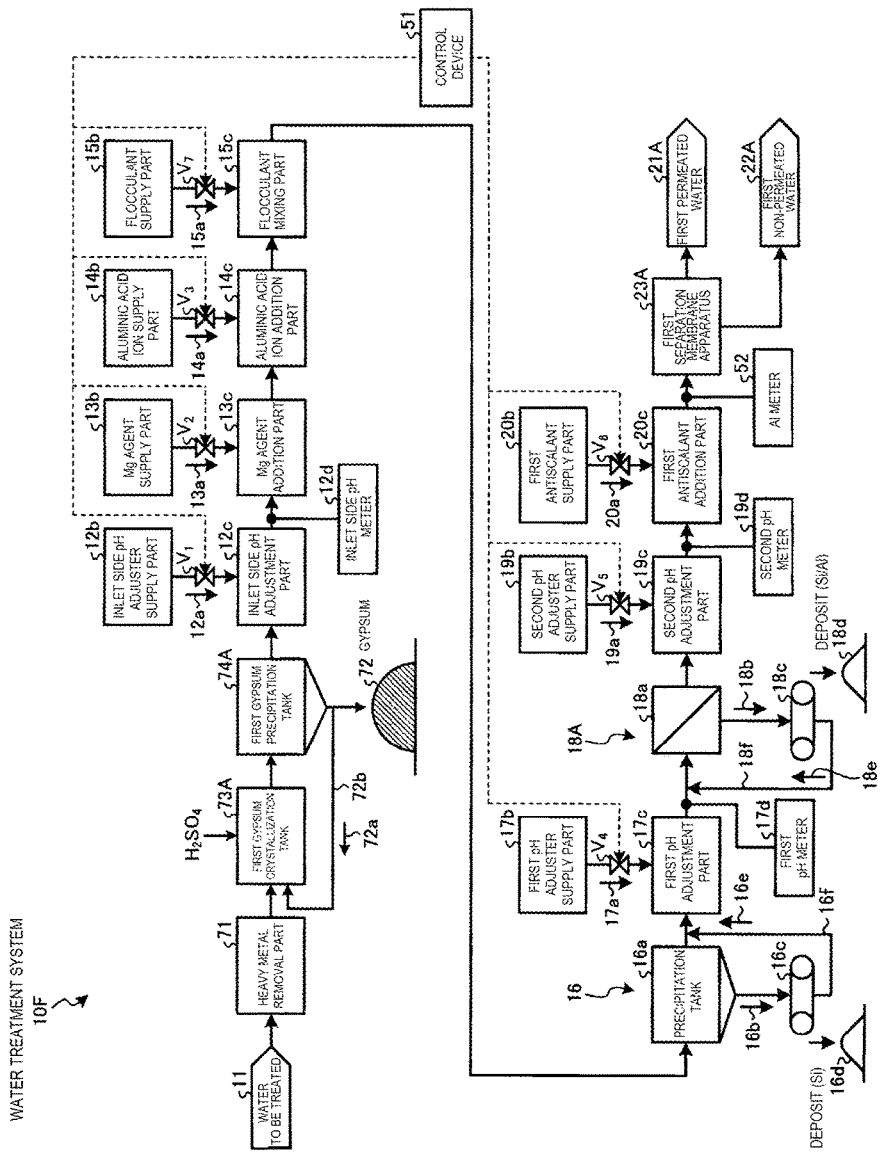
FIG. 14 is a schematic view illustrating a water treatment system of Working Example 5.

FIG. 14 is a schematic view illustrating a water treatment system of Working Example 5. Note that members that are the same as those of the configuration of the water treatment system of Working Example 1 are labeled with the same symbols, and descriptions thereof are omitted.

As illustrated in FIG. 14, the water treatment system 10F of this working example is provided with a first gypsum crystallization tank 73A for crystallizing gypsum 72 in the water to be treated 11 on the downstream side of the heavy metal removal part 71 in the water treatment system 10E of FIG. 13. The gypsum 72 crystallized by this first gypsum crystallization tank 73A is separated by means of precipitation by a first gypsum precipitation tank 74A provided on the downstream side of the first gypsum crystallization tank 73A.

Here, in the first gypsum crystallization tank 73A, sulfuric acid $H_2SO_4$) is added so as to actively precipitate excess Ca content.

As water to be treated 11, gypsum may be contained in the desulfurization waste water from a desulfurization apparatus using a wet lime/gypsum method, for example. Therefore, in this working example, the gypsum 72 in the water to be treated 11 is treated by the first gypsum crystallization tank 73A and then separated by means of precipitation by the first gypsum precipitation tank 74A. In addition, a seed crystal supply line 72b for supplying a seed crystal 72a for accelerating gypsum deposition may be provided in the first gypsum crystallization tank 73A.

According to this working example, the gypsum in dense desulfurization waste water is separated by pretreatment, and the silica deposits are then treated so that the water can be recycled. This makes it possible to dramatically reduce the total dissolved solid (TDS) in the water to be treated 11.

According to the present invention, pretreatment is performed to dramatically reduce the total dissolved solid (TDS) in the water to be treated 11, and the same operations as in Working Example 1 are then performed to deposit and treat the soluble silica so that the water can be recycled.

Embodiment 6

The water treatment system of Working Example 6 of the present invention will be described hereinafter with reference to the drawings.

Figure 15:
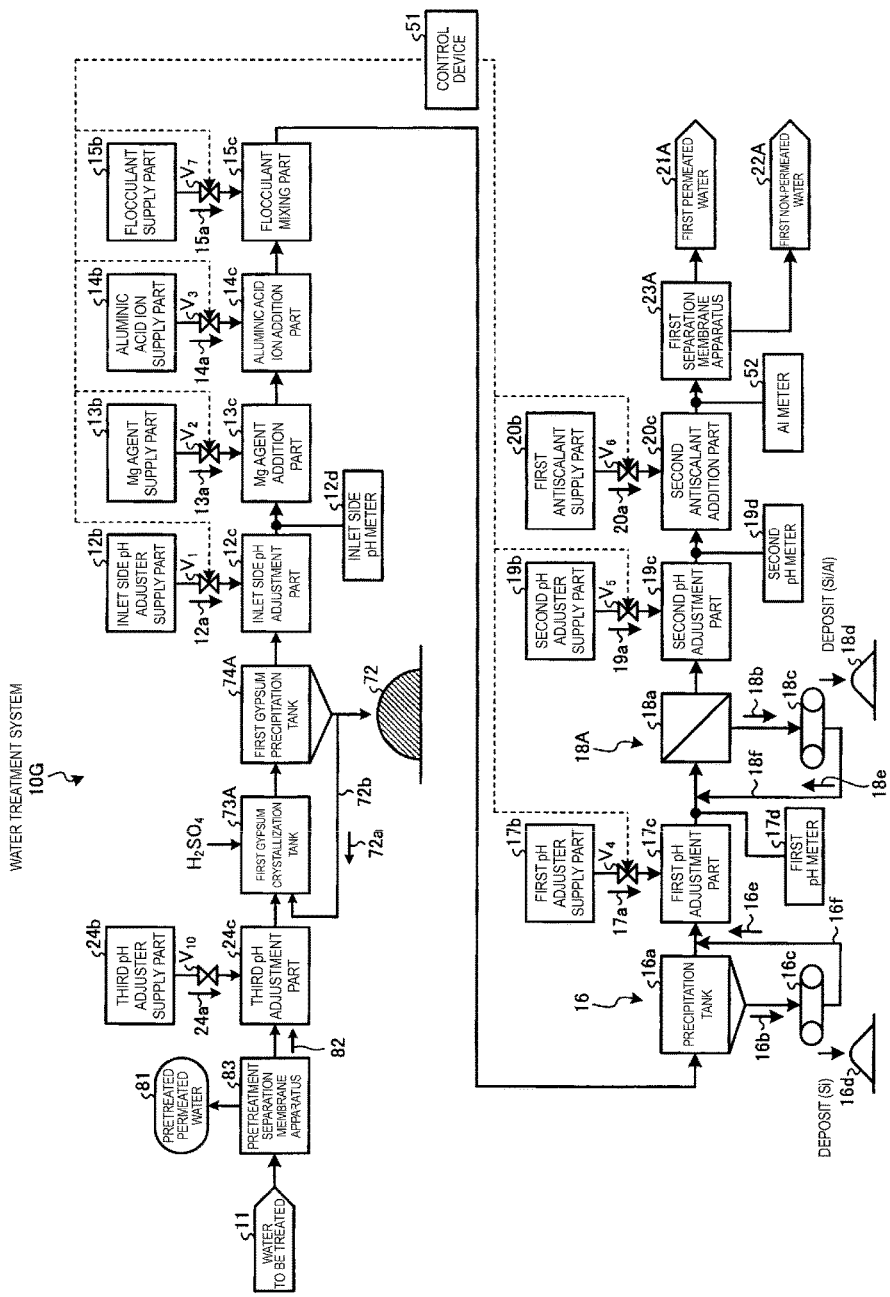
FIG. 15 is a schematic view illustrating a water treatment system of Working Example 6.

FIG. 15 is a schematic view illustrating a water treatment system of Working Example 6. Note that members that are the same as those of the configuration of the water treatment system of Working Example 1 are labeled with the same symbols, and descriptions thereof are omitted.

As illustrated in FIG. 15, the water treatment system 10G of this working example is one in which the water treatment system 10A of FIG. 1 is equipped with a pretreatment separation membrane (desalination treatment) apparatus 83 for separating the water to be treated 11 into pretreated permeated water (recycled water) 81 and pretreated non-permeated water (concentrated water) 82 by removing the salt content in the water to be treated 11 on the upstream side of the inlet side pH adjustment part 12c; a third pH adjustment part 24c provided on the downstream side of the separation membrane apparatus for pretreatment part 83 so as to adjust the pH of the pretreated non-permeated water 82 to the acidic side (at most pH 4) of a third pH level by supplying a third pH adjusting agent 24a from the third pH adjusting agent supply part 24b to the pretreated non-permeated water 82; and a first gypsum crystallization tank 73A provided on the downstream side of the third pH adjustment part 24c so as to crystallize gypsum 72 from the pretreated non-permeated water 82; and a first gypsum precipitation tank 74A for precipitating and separating the crystallized gypsum 72. In addition, a seed crystal supply line 72b for supplying a seed crystal 72a for accelerating gypsum deposition may be provided in the first gypsum crystallization tank 73A.

As water to be treated 11, desulfurization waste water from a desulfurization apparatus, for example, may be diluted so that the silica concentration of influent water flowing into the first separation membrane apparatus 23A is lower than the prescribed threshold.

In such cases, the membrane separation of the water is performed as pretreatment by the separation membrane apparatus for pretreatment 83 before silica deposition is performed with the aluminate ion additive 14a, after treatment is then performed to dramatically reduce the total dissolved solid (TDS) in the water to be treated 11 and to then increase the silica concentration in the pretreated non-permeated water 82, silica deposition treatment is performed with the aluminate ion additive 14a of Working Example 1.

According to this working example, when the silica concentration is low, for example, recycled water is first produced by the separation membrane apparatus for pretreatment 83, and after pretreatment is performed to dramatically reduce the total dissolved solid (TDS) in the water to be treated 11, the same operations as in Working Example 1 are performed once so as to deposit and treat the soluble silica so that the water can be recycled.

Embodiment 7

The water treatment system of Working Example 7 of the present invention will be described hereinafter with reference to the drawings.

Figure 16:
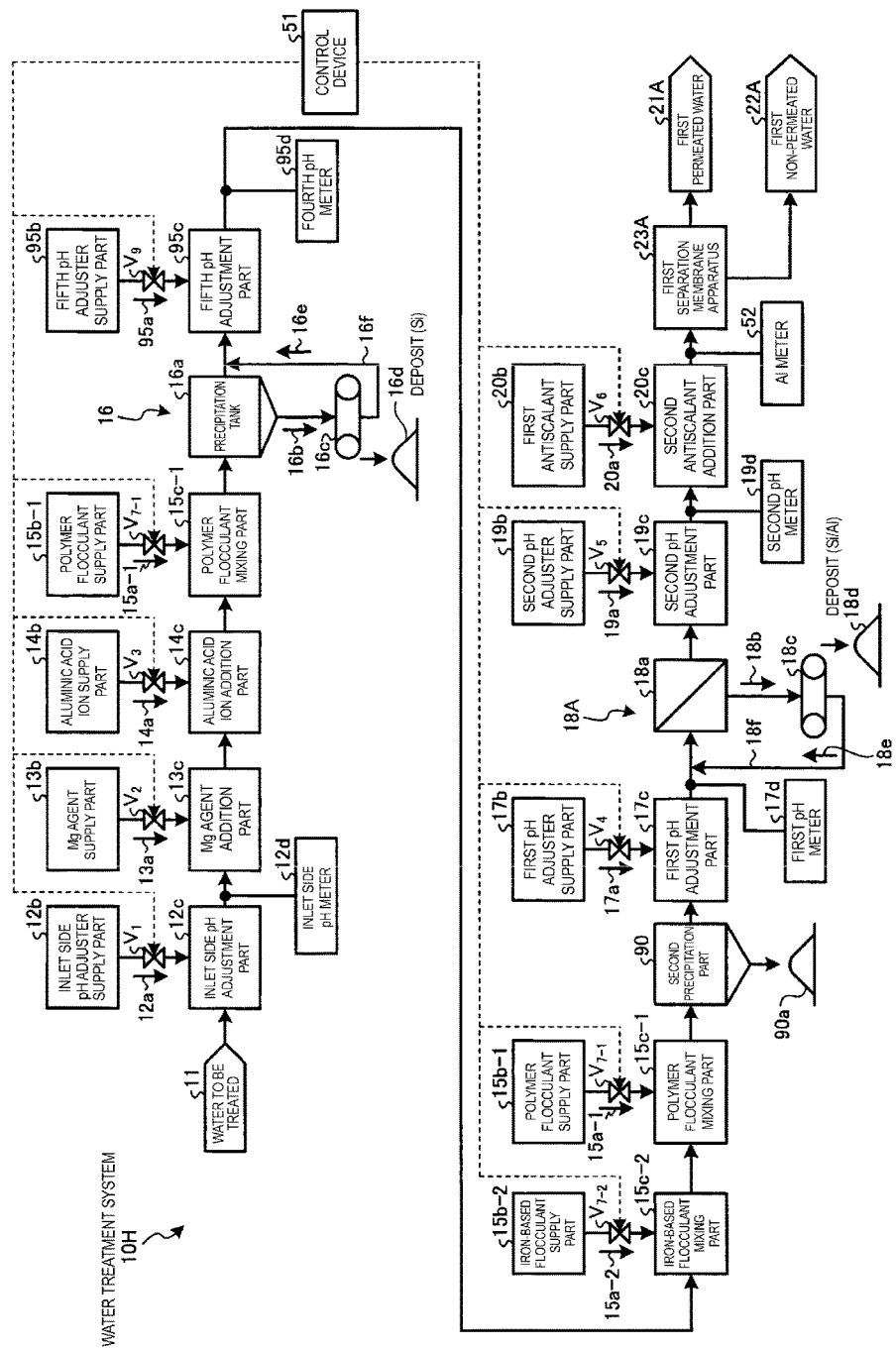
FIG. 16 is a schematic view illustrating a water treatment system of Working Example 7.

FIG. 16 is a schematic view illustrating a water treatment system of Working Example 7. Note that members that are the same as those of the configuration of the water treatment system of Working Example 1 are labeled with the same symbols, and descriptions thereof are omitted.

As illustrated in FIG. 16, the water treatment system 10H of this working example is one in which, in the water treatment system 10A of Working Example 1, two different types of flocculants consisting of a polymer flocculant 15a-1 and an iron-based flocculant 15a-2 are used and added in front of and behind the first precipitation part 16.

First, a polymer flocculant mixing part 15c-1 for adding the polymer flocculant 15a-1 from a flocculant supply part 15b-1 is provided between the aluminate ion additive part 14c and the first precipitation part 16. In addition, an iron-based flocculant mixing part 15c-2 having an iron-based flocculant supply part 15b-2 for adding the iron-based flocculant (ferric chloride $FeCl_2$) is provided on the downstream side of the first precipitation part 16 and the upstream side of the first pH adjustment part 17c. Further, a polymer flocculant mixing part 15c-1 for adding the polymer flocculant 15a-1 from the flocculant supply part 15b-1 is provided on the downstream side of the iron-based flocculant mixing part 15c-2. In addition, a second precipitation part 90 for precipitating and separating the coagulated precipitate produced by the polymer flocculant 15a-1 is provided.

In this working example, as illustrated in FIG. 16, a fifth pH adjustment part 95 for supplying a fifth pH adjusting agent 95a from a fifth pH adjusting agent supply part 95b is provided between the precipitation tank 16a and the iron-based flocculant mixing part 15c-2. Next, in this fifth pH adjustment, the pH of the water to be treated 11 is controlled to a prescribed pH by adjusting the degree of opening of the valve V9 based on the pH of the water to be treated 11 measured by a fourth pH meter 95d and changing the added amount of the fifth pH adjusting agent 95a with respect to the water to be treated 11.

In this working example, after the aluminate ion additive 14a is added by the aluminate ion addition part 14c, flocs of the Al—SiO$_2$ compound are enlarged by the polymer flocculant 15a-1 in the polymer flocculant mixing part 15c-1, and the deposit 16d of the soluble silica in the water to be treated 11 is removed in the precipitation tank 16a of the first precipitation part 16.

Next, the pH is adjusted to a prescribed level, and the supernatant liquid from the first precipitation part 16 is introduced into the iron-based flocculant mixing part 15c-2. In the iron-based flocculant mixing part 15c-2, an iron-based flocculant 15a-2 such as ferric chloride (FeCl$_3$), for example, is added and reacted with the residual soluble silica in the water to be treated 11 so as to produce a deposit (Fe—SiO$_2$) compound.

The prescribed pH at the time of coagulation and precipitation in the iron-based flocculant mixing part 15c-2 is not particularly limited, but when adjusted in the fifth adjusting agent adjustment part 95c, it is preferably from 5 to 10, more preferably from pH 6 to 8, and even more preferably pH 7. As a result, each coagulation and precipitation treatment is performed reliably by respectively adjusting the pH of the coagulation treatment by adding the aluminate ion additive 14a (in the range of pH 8 to 10) and adjusting the pH of coagulation treatment by adding the iron-based flocculant 15a-2 (in the range of pH 5 to 10).

Next, flocs of the deposit (Fe—SiO$_2$ compound) are enlarged by the polymer flocculant 15a-1 in the polymer flocculant mixing part 15c-1, and the deposit 90a of the soluble silica in the water to be treated 11 is removed in the second precipitation part 90.

Next, the pH of the water to be treated 11 is adjusted to a prescribed range (pH 5 to 7) by adding the first pH adjusting agent 17a with the first pH adjustment part 17c to the water to be treated 11 from which the deposit (Fe—SiO$_2$ compound) is removed.

That is, according to this working example, the residue of the deposit 16d of the soluble silica that is precipitated and separated by the first precipitation part 16 is further subjected to coagulation treatment with a different type of iron-based flocculant 15a-2 so as to remove the deposit produced by the iron-flocculant (Fe—SiO$_2$) as a precipitate 90a in the second precipitation part 90. This makes it possible to remove SiO$_2$ components that cannot be removed by the aluminate ion 14a. In addition, the polymer flocculant mixing part 15c-1, which is installed on the downstream side of the iron-based flocculant mixing part 15c-2 provided to enlarge the flocs of the deposit (Fe—SiO$_2$ compound), may be omitted as necessary.

Embodiment 8

The water treatment system of Working Example 8 of the present invention will be described hereinafter with reference to the drawings.

Figure 17:
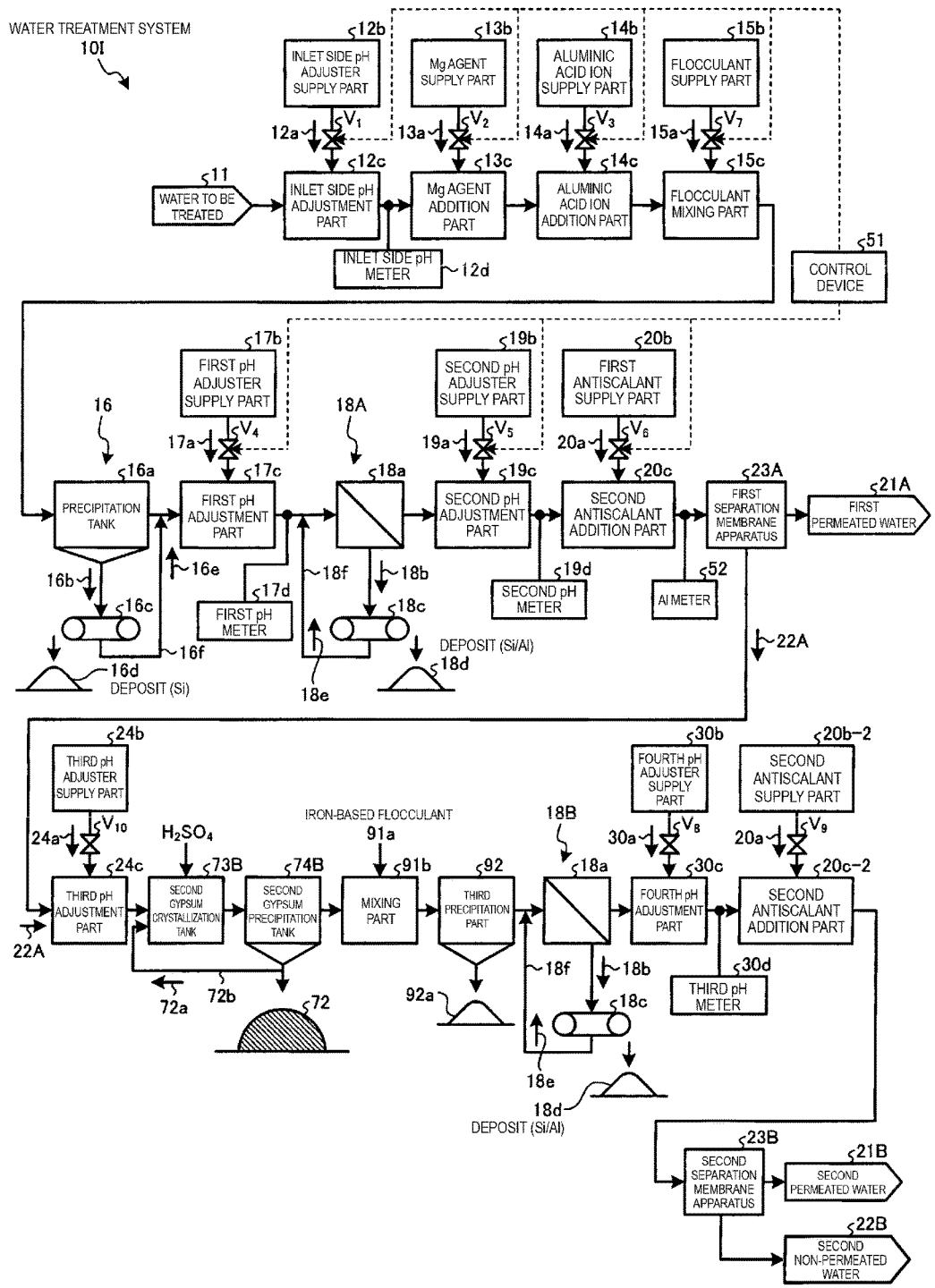
FIG. 17 is a schematic view illustrating a water treatment system of Working Example 8.

FIG. 17 is a schematic view illustrating a water treatment system of Working Example 8. Note that members that are the same as those of the configuration of the water treatment system of Working Example 1 are labeled with the same symbols, and descriptions thereof are omitted.

As illustrated in FIG. 17, the water treatment system 10I of this working example is one in which the water treatment system 10A of Working Example 1 is equipped with: a third pH adjustment part provided on the downstream side of the first separation membrane apparatus 23A so as to adjust the pH of the first non-permeated water 22A to the acidic side (at most pH 4) of a third pH level by supplying a third pH adjusting agent 24a to the first non-permeated water 22A from a third pH adjusting agent supply part 24b; a second gypsum crystallization tank 73B provided on the downstream side of the third pH adjustment part 24c so as to crystallize gypsum 72 from the first concentrated water 22A adjusted to the acidic side; a seen crystal supply line 72b for supplying a seed crystal 72a of the gypsum 72 to the second gypsum crystallization tank 73B; a second gypsum precipitation tank 74B for precipitating and separating the crystallized gypsum 72; a mixing part 91b provided on the downstream side of the second gypsum precipitation tank 74B so as to add an iron-based flocculant (for example, iron chloride or the like) 91a to the supernatant water from the second gypsum precipitation tank 74B; a third precipitation part 92 for precipitating and separating the coagulated precipitate 92a produced by the iron-based flocculant 91a; a second solid/liquid separation part (for example, a UF membrane, an NF membrane, an MF membrane, or the like) for performing solid/liquid separation on the residual aggregates in the supernatant water from the third precipitation part 92; a fourth pH adjustment part 30c provided on the downstream side of the second solid/liquid separation part 18B so as to adjust the pH of the separated and concentrated water to the acidic side (pH 4 to 5) of a fifth pH level by supplying a fourth pH adjusting agent 30a from a fourth pH adjusting agent supply part 30b to the water to be treated (supernatant water) from the second solid/liquid separation part 18B; a second antiscalant addition part 20c-2 provided on the downstream side of the fourth pH adjustment part 30c so as to supply a second antiscalant 20a to the separated and concentrated water from a second antiscalant supply part 20b-2; and a second separation membrane apparatus 23B provided on the downstream of the second antiscalant addition part 20c-2 so as to separate the water to be treated 11 into second permeated water (recycled water) 21B and second non-permeated water (concentrated water) 22B by removing the salt content in the water to be treated 11.

The non-permeated water 22A having a pH that is adjusted by the third pH adjustment part 24c is stored in the second gypsum crystallization tank 73B. As a result of the third pH adjustment, the function of the first antiscalant 20a is reduced in the second crystallization tank 73B. Therefore, gypsum 72 that has become oversaturated in the second crystallization tank 73B is crystallized. When seed crystal gypsum is to be separately loaded as a seed crystal in the crystallization step, the gypsum 72 grows as a crystal using the loaded seed crystal gypsum 72a as a core.

The gypsum 72 is precipitated and separated by the second gypsum precipitation tank 74B, and after the iron-based flocculant 91a is added to the concentrated water on the supernatant side that is discharged from the second gypsum precipitation tank 74B, the coagulated precipitate (residual gypsum and calcium carbonate in the concentrated water after gypsum separation, and residual metal hydroxides in the concentrated water) 92a is precipitated and separated by the third precipitation part 92.

The residual solid matter in the second solid/liquid separation part 18B is then further separated by an UF membrane or the like, for example, and after the pH is adjusted by the fourth pH adjustment part 30c, it is introduced into the second separation membrane apparatus 23B. In the fourth pH adjustment, the pH of the water to be treated 11 is controlled to the second pH level (at most pH 5) by adjusting the degree of opening of the valve $V_8$ based on the pH of the water to be treated 11 measured by the third pH meter 30d and changing the added amount of the fourth pH adjusting agent 30a with respect to the water to be treated 11.

Before flowing into the second separation membrane apparatus 23B, the antiscalant 20a may be additionally added from the second antiscalant supply part 20b-2.

In addition, an acid of the fourth pH adjusting agent 30a may be supplied after the antiscalant 20a is added.

In the second separation membrane apparatus 23B, the non-permeated water 22A serving as concentrated water from the first separation membrane apparatus 23A is treated. The water passing through the reverse osmosis membrane of the second separation membrane apparatus 23B is recovered as second permeated water 21B serving as recycled water. The second non-permeated water serving as the concentrated water of the second separation membrane apparatus 23B is discharged to the outside of the system.

As described in this working example, when the second separation membrane apparatus 23B is installed, it is possible to further recover the second permeated water 21B as recycled water from the concentrated water on the supernatant liquid side after the gypsum 72 is crystallized, so the water recovery rate is further enhanced.

The gypsum 72 is removed from the first non-permeated water 22A from the first separation membrane apparatus 23A by treatment in the second crystallization tank 73B, so the ion concentration is low.

Therefore, the osmotic pressure of the second separation membrane apparatus 23B can be reduced to a greater degree than when the gypsum 72 is not removed, so that required power is reduced.

In addition, an evaporator (illustrated in FIG. 2) may be installed. When this evaporator is installed, water is evaporated from the second non-permeated water 22B, and the ions that had been contained in the second non-permeated water 22B are deposited as a solid and recovered as a solid. The water is recovered as the second permeated water 21B on the upstream side of the evaporator, and the amount of concentrated water is dramatically reduced, which makes it possible to achieve an evaporator with a compact design and to reduce the energy required for evaporation.

In addition, a second gypsum crystallization tank for further crystallizing gypsum may also be provided on the downstream side of the second membrane separation apparatus 23B so as to separate the gypsum 72 in the second non-permeated water 22B, and post-treatment may be performed similarly thereafter. A third separation membrane apparatus may be provided as a desalination part so as to perform three stages of desalination treatment and to increase the amount of permeated water that is produced.

As described above, according to the water treatment systems 10A to I of these working examples, the pH of the water to be treated 11 containing soluble silica is adjusted to a prescribed pH (for example, pH 8 to 9) with the inlet side pH adjustment part 12c, and the aluminate ion additive 14a is added thereafter, so the soluble silica in the water to be treated 11 is deposited directly as an aluminum silica (Al—$SiO_2$) compound without being coagulated in the water to be treated 11. After this deposit is separated and removed, the pH is adjusted to the first pH level (pH 5 to 7) by the first pH adjustment part 17c so as to remove the residual aluminate ion additive 14a, and the pH is adjusted to the second pH level (at most pH 5) by the second pH adjustment part 19c so as to realize a water treatment system with no deposition of deposits in the first separation film membrane apparatus 23A.

Embodiment 9

The water treatment system of Working Example 9 of the present invention will be described hereinafter with reference to the drawings.

Figure 18:
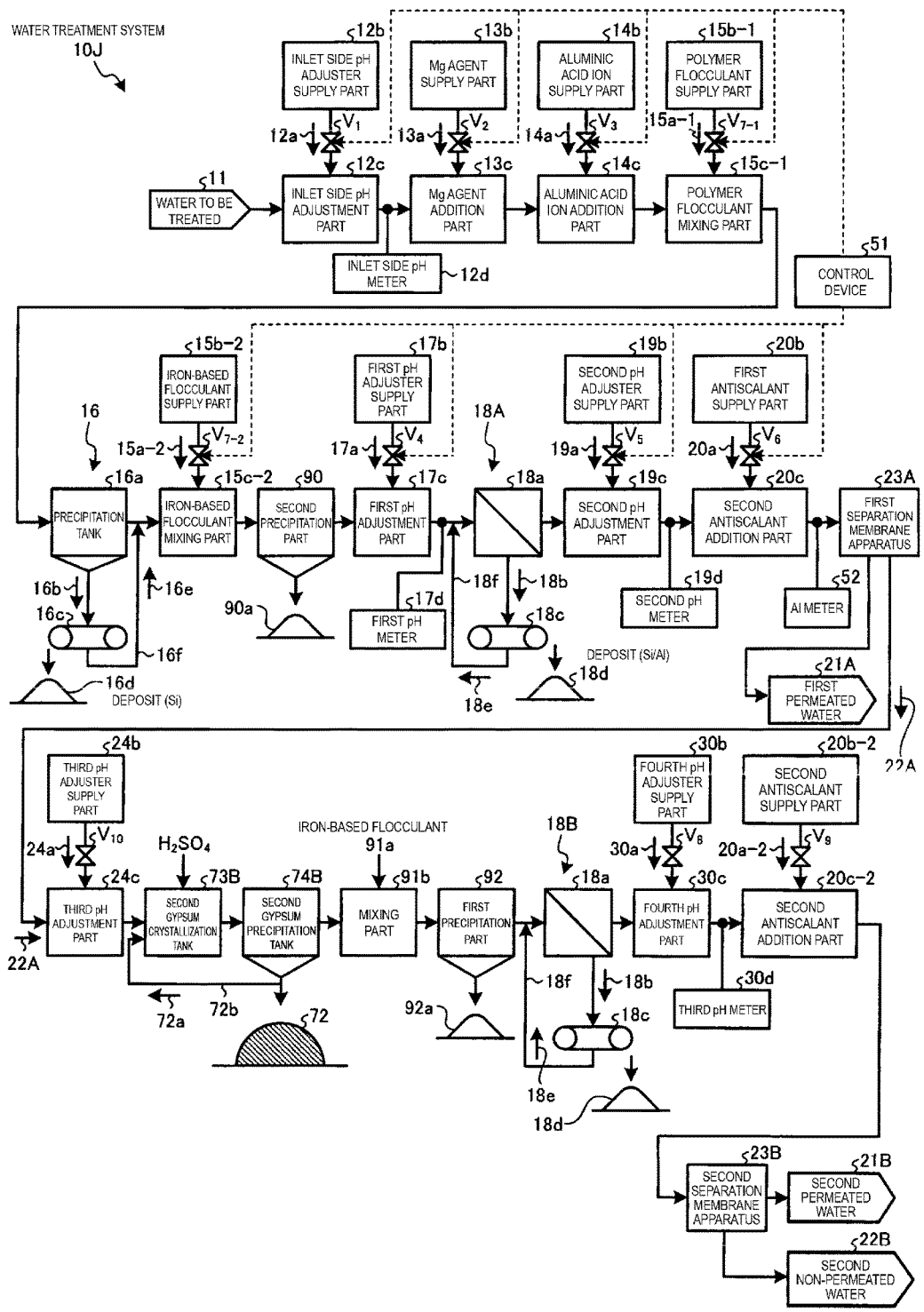
FIG. 18 is a schematic view illustrating a water treatment system of Working Example 9.

FIG. 18 is a schematic view illustrating a water treatment system of Working Example 9. Note that members that are the same as those of the configurations of the water treatment systems of Working Examples 1 and 7 are labeled with the same symbols, and descriptions thereof are omitted.

As illustrated in FIG. 17, the water treatment system 10J of this working example is one in which the water treatment system 10I of Working Example 8 is provided with a polymer flocculant mixing part 15c-1 for adding a polymer flocculant 15a-1 from a flocculant supply part 15b-1 on the downstream side of the aluminate ion addition part 14c. In addition, an iron-based flocculant mixing part 15c-2 for adding an iron-based flocculant (ferric chloride ($FeCl_3$ or the like) 15a-2 from an iron-based flocculant supply part 15b-2 is provided on the downstream side of the first precipitation part 16, and a third precipitation part 90 for precipitating and separating the coagulated deposit produced by the iron-based flocculant is provided on the downstream side of the iron-based flocculant mixing part 15c-2.

Flocs of the Al—$SiO_2$ compound are enlarged by the polymer flocculant 15a-1 in the polymer flocculant mixing part 15c-1, and the deposit 16d of the soluble silica in the water to be treated 11 is removed in the first precipitation tank 16a. Next, the supernatant liquid from the first precipitation part 16 is introduced into the iron-based flocculant mixing part 15c-2, and an iron-based flocculant 15a-2 such as ferric chloride ($FeCl_3$), for example, so as to react with the residual silica in the water to be treated 11 and to be deposited as a deposit (Fe—$SiO_2$ compound).

That is, according to this working example, the residue of the deposit 16d of the soluble silica that is precipitated and separated by the first precipitation part 16 is further subjected to coagulation treatment with a different type of iron-based flocculant 15a-2 so that the precipitate 90a is removed by the second precipitation part 90 as a deposit (Fe—$SiO_2$ compound). This makes it possible to remove $SiO_2$ components that cannot be removed by the aluminate ion 14a.

Next, the pH of the water to be treated 11 is adjusted to a prescribed range (pH 5 to 7) by adding the first pH adjusting agent 17a with the first pH adjustment part 17c to the water to be treated 11 from which the deposit (Fe—$SiO_2$ compound) is removed.

Embodiment 10

The water treatment system of Working Example 10 of the present invention will be described hereinafter with reference to the drawings.

Figure 19:
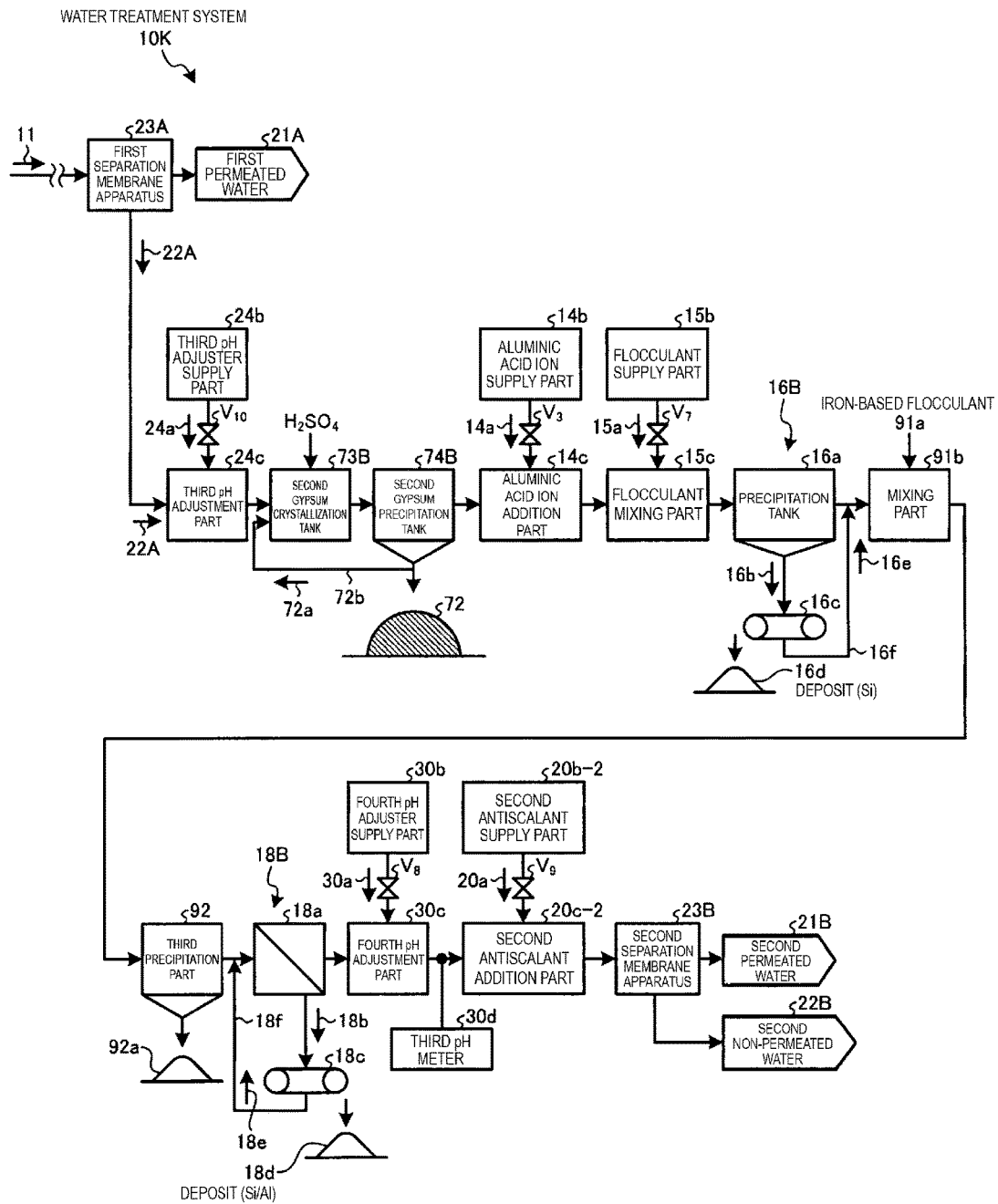
FIG. 19 is a schematic view illustrating a water treatment system of Working Example 10.

FIG. 19 is a schematic view illustrating a water treatment system of Working Example 10. Note that members that are the same as those of the configurations of the water treatment systems of Working Examples 1 and 7 are labeled with the same symbols, and descriptions thereof are omitted.

As illustrated in FIG. 19, the configuration of the water treatment system 10J of this working example up to the first separation membrane apparatus 23A is the same as in the water treatment system 10H of Working Example 7, so explanations and drawings thereof are omitted, and the configuration from the first separation apparatus 23A and onward will be described.

As illustrated in FIG. 19, the water treatment system 10K of this working example is further provided with: an aluminate ion addition part 14c provided on the downstream side of the second gypsum precipitation tank 74B for separating the gypsum 72 in the first non-permeated water (concentrated water) 22A so as to supply and add an aluminate ion additive 14a from an aluminate ion supply part 14b; a flocculant mixing part 15c provided on the downstream side of the aluminate ion addition part 14c so as to add a flocculant 15a; and a fourth precipitation part 16B provided on the downstream side of the flocculant mixing part 15c so as to precipitate and separate the solid content in the water to be treated 11.

The soluble silica content of the first non-permeated water (concentrated water) 22A, in which the water to be treated 11 is concentrated by the first separation membrane apparatus 23A, is also increased by concentration. Therefore, in this working example, in order to reduce the concentration of soluble silica in the concentrated water after the gypsum 72 has been separated by the second gypsum crystallization tank 73B and the second gypsum precipitation tank 74B, an aluminate ion 14a is added by the aluminate ion addition part 14c so as to deposit a compound of soluble silica and the aluminate ion (so-called "aluminum silica ($Al-SiO_2$ compound"), and the solid/liquid separation of the water to be treated 11 is then accelerated using the flocculant 15a.

This makes it possible to remove the soluble silica that is concentrated by the first separation membrane apparatus 23A as a deposit.

REFERENCE SIGNS LIST 10A to 10K Water treatment systems
11 Water to be treated
14a Aluminate ion additive
14b Aluminate ion supply part
14c Aluminate ion addition part
16 First precipitation part
90 Second precipitation part
92 Third precipitation part
17a First pH adjusting agent
17b First pH adjusting agent supply part
17c First pH adjustment part
18A First solid/liquid separation part
18B Second solid/liquid separation part
19a Second pH adjusting agent
19b Second pH adjusting agent supply part
19c Second pH adjustment part
21A First permeated water (recycled water)
21B Second permeated water (recycled water)
22A First non-permeated water (concentrated water)
22B Second non-permeated water (concentrated water)
23A First separation membrane apparatus
23B Second separation membrane apparatus

The invention claimed is:

1. A water treatment system comprising:
an aluminate ion addition part for adding an aluminate ion additive to water containing at least salt content and silica;
a first precipitation part provided on a downstream side of the aluminate ion addition part so as to precipitate and separate solid content in the water;
a first pH adjustment part provided on a downstream side of the first precipitation part so as to adjust a pH level of the water from the first precipitation part to a first pH level for precipitating residual aluminum in the water by supplying a first pH adjuster to the water from the first precipitation part;
a first solid/liquid separation part provided on a downstream side of the first pH adjustment part so as to separate solid content containing aluminum and silica in the water that has been adjusted to the first pH level;
a second pH adjustment part provided on a downstream side of the first solid/liquid separation part so as to adjust a pH in the water to a second pH level of at most pH 5 by supplying a second pH adjusting agent to the water from the first solid/liquid separation part; and
a first separation membrane apparatus provided on a downstream side of the second pH adjustment part so as to separate the water into first permeated water and first non-permeated water by removing salt content in the water.

2. The water treatment system according to claim 1, further comprising:
a heavy metal removal part provided on an upstream side of the aluminate ion addition part so as to remove heavy metals from the water.

3. The water treatment system according to claim 2, further comprising:
a first gypsum crystallization tank provided on a downstream side of the heavy metal removal part so as to crystallize gypsum from the water; and
a first gypsum precipitation tank for precipitating and separating the crystallized gypsum.

4. The water treatment system according to claim 1, further comprising:
a second separation membrane apparatus for pretreatment provided on an upstream side of the aluminate ion addition part so as to separate the water into pretreated permeated water and pretreated non-permeated water by removing salt content in the water;
a third pH adjustment part provided on a downstream side of the separation membrane apparatus for pretreatment so as to adjust a pH of the pretreated non-permeated water to an acidic side of a third pH level by supplying a third pH adjusting agent to the pretreated non-permeated water;
a first gypsum crystallization tank provided on a downstream side of the third pH adjustment part so as to crystallize gypsum from the pretreated non-permeated water; and
a first gypsum precipitation tank for precipitating and separating the crystallized gypsum.

5. The water treatment system according to claim 1, further comprising:
an inlet side pH adjustment part so as to adjust the water to an alkaline side by supplying an inlet side pH adjusting agent to the water that is introduced from an inlet side of the water treatment system.

6. The water treatment system according to claim 1, further comprising:
a Mg agent addition part provided on an upstream side of the aluminate ion addition part so as to add a Mg agent to the water.

7. The water treatment system according to claim 1, further comprising:
a flocculant mixing part provided on a downstream side of the aluminate ion addition part so as to add and mix a flocculant into the water to which the aluminate ion additive has been added.

8. The water treatment system according to claim 7, wherein
the flocculant mixing part comprises a polymer flocculant mixing part and an iron-based flocculant mixing part.

9. The water treatment system according to claim 1, further comprising:
a concentrator for concentrating first non-permeated water from the first separation membrane apparatus.

10. The water treatment system according to claim 1, further comprising:
- a silica concentration meter for measuring a concentration of silica in the water and an aluminum concentration meter for measuring a concentration of aluminum in the water between the first solid/liquid separation part and the first separation membrane apparatus; and
- a control device which, as a result of the monitoring of the silica concentration meter or the aluminum concentration meter, changes to operating conditions in which the silica concentration and/or the aluminum concentration are set to at most a prescribed threshold.

11. The water treatment system according to claim 1, further comprising:
- a membrane separation state monitoring part for monitoring a desalination state of the first separation membrane apparatus; and
- a control device which, as a result of the monitoring of the membrane separation state monitoring part, executes washing treatment on the first separation membrane apparatus and/or changes to operating conditions in which adhered matter of the first separation membrane apparatus does not adhere to the membrane.

12. The water treatment system according to claim 1, further comprising:
- a third pH adjustment part provided on a downstream side of the first separation membrane apparatus so as to adjust a pH of the first non-permeated water to an acidic side of a third pH level by supplying a third pH adjusting agent to the first non-permeated water;
- a second gypsum crystallization tank provided on a downstream side of the third pH adjustment part so as to crystallize gypsum from the first concentrated water;
- a second gypsum precipitation tank for precipitating and separating the crystallized gypsum;
- a flocculant mixing part provided on a downstream side of the second gypsum precipitation tank so as to add a flocculant to supernatant water from the second gypsum precipitation tank;
- a second precipitation part for precipitating and separating a precipitate produced by the flocculant;
- a second solid/liquid separation part for performing solid/liquid separation on residual aggregates in the supernatant water from the second precipitation part;
- a fourth pH adjustment part provided on a downstream side of the second solid/liquid separation part so as to adjust a pH of the separated and concentrated water to an acidic side of a fifth pH level by supplying a fourth pH adjusting agent to supernatant water from the second solid/liquid separation part; and
- a second separation membrane apparatus provided on a downstream side of the fourth pH adjustment part so as to separate the water to be treated into second permeated water and second non-permeated water by removing salt content in the water to be treated.

13. The water treatment system according to claim 1, wherein
the permeated water is makeup water for a plant facility or water for miscellaneous use.

14. A power generation facility comprising the water treatment system described in claim 1.

* * * * *